United States Patent
Jaganmohan

(10) Patent No.: US 10,943,072 B1
(45) Date of Patent: Mar. 9, 2021

(54) CONTEXTUAL AND INTENT BASED NATURAL LANGUAGE PROCESSING SYSTEM AND METHOD

(71) Applicant: ConverSight.ai, Inc., Columbus, IN (US)

(72) Inventor: Gopinath Jaganmohan, Carmel, IN (US)

(73) Assignee: ConverSight.ai, Inc., Columbus, IN (US)

(*) Notice: Subject to any disclaimer, the term of this patent is extended or adjusted under 35 U.S.C. 154(b) by 0 days.

(21) Appl. No.: 17/105,114

(22) Filed: Nov. 25, 2020

Related U.S. Application Data

(60) Provisional application No. 62/941,025, filed on Nov. 27, 2019.

(51) Int. Cl.
| | |
|---|---|
| *G06F 40/30* | (2020.01) |
| *G06F 16/28* | (2019.01) |
| *G06F 3/0482* | (2013.01) |
| *G06F 40/279* | (2020.01) |
| *G06N 3/08* | (2006.01) |

(52) U.S. Cl.
CPC ............ *G06F 40/30* (2020.01); *G06F 3/0482* (2013.01); *G06F 16/288* (2019.01); *G06F 40/279* (2020.01); *G06N 3/08* (2013.01)

(58) Field of Classification Search
CPC ...... G06F 40/30; G06F 16/288; G06F 40/279; G06F 3/0482; G06N 3/08
See application file for complete search history.

(56) References Cited

U.S. PATENT DOCUMENTS

| | | | |
|---|---|---|---|
| 9,665,643 B2 | 5/2017 | Li et al. | |
| 2008/0270458 A1* | 10/2008 | Gvelesiani | G06F 16/287 |
| 2015/0309992 A1* | 10/2015 | Visel | G06F 40/30 |
| | | | 704/9 |
| 2016/0163311 A1* | 6/2016 | Crook | G10L 15/065 |
| | | | 704/275 |
| 2016/0283525 A1* | 9/2016 | Farenden | G06F 40/205 |
| 2016/0292304 A1* | 10/2016 | Kartha | G06N 5/027 |
| 2018/0150753 A1* | 5/2018 | Farrell | G06N 5/022 |
| 2019/0179893 A1* | 6/2019 | Mulwad | G06F 40/284 |
| 2019/0188326 A1* | 6/2019 | Daianu | G06N 5/022 |
| 2019/0212879 A1* | 7/2019 | Anand | G06F 16/9024 |

(Continued)

*Primary Examiner* — Kevin Ky
(74) *Attorney, Agent, or Firm* — American Patent Agency PC; Daniar Hussain; Xiaomeng Shi

(57) ABSTRACT

Methods and systems are disclosed for an artificial intelligence (AI)-based, conversational insight and action platform for user context and intent-based natural language processing and data insight generation. Using artificial intelligence and semantic analysis techniques, a knowledge graph is generated from structured data, and a word embedding is generated from unstructured data. A semantic meaning is extracted from a user request, and at least one user attribute and context are determined. One or more entities and relationships on the knowledge graph that match the semantic meaning are determined, based on the user attribute, context, and the word embedding. A sequence of analytical instructions is generated from the matching results, and applied to the structured data to generate a data insight response to the user request. If no matches are found, similar entities and relationships are presented to the user, and user selections are used to further train the system.

17 Claims, 19 Drawing Sheets

(56) References Cited

U.S. PATENT DOCUMENTS

| | | | |
|---|---|---|---|
| 2019/0327331 A1* | 10/2019 | Natarajan | G06F 8/31 |
| 2019/0354883 A1 | 11/2019 | Aravamudan et al. | |
| 2019/0361961 A1* | 11/2019 | Zambre | G06N 3/08 |
| 2020/0042642 A1* | 2/2020 | Bakis | G06F 16/243 |
| 2020/0042644 A1* | 2/2020 | Jagan | G06F 40/30 |
| 2020/0042649 A1* | 2/2020 | Bakis | G06N 20/00 |
| 2020/0057946 A1 | 2/2020 | Singaraju et al. | |
| 2020/0125648 A1* | 4/2020 | Jiang | G06F 16/285 |
| 2020/0320086 A1* | 10/2020 | Liu | G06F 16/335 |

* cited by examiner

CONTEXTUAL AND INTENT BASED NATURAL LANGUAGE PROCESSING SYSTEM AND METHOD

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of natural language processing, and pertain particularly to methods and systems for a conversational artificial intelligence (AI) platform that synthesizes knowledge and insights from both structured and unstructured data.

BACKGROUND OF THE INVENTION

The statements in the background of the invention section are provided merely for assisting with understanding the invention and its application and uses, and may not constitute prior art.

A vast majority of data and information in the modern age is stored in electronic format. For example, enterprise data are almost always entirely stored for at least a certain amount of time, with portions indexed for easy access later. Yet, a gap exists from storing data to truly using and extracting value from such data. Modern Customer Relationship Management (CRM) and Enterprise Resource Planning (ERP) software and databases have seen rapid growth and development, leading to an unprecedented explosion in data collection and analytics generation, yet the benefit of such systems is greatly dependent upon software usability and user compliance, with dedicated and lengthy user training required in software access and data interpretation. A direct consequence of these limitations is the inaccessibility to real-time insights and a significant number of lost business opportunities.

There have been many attempts at bridging this gap between storing data and accessing insights in real-time, but with limited success. Traditional document management systems rely on established system architectures and data structures that are often incapable of adequately addressing dynamic user needs for data insight. For example, a particular element of information desired by the user may not exist beforehand in the system, and the onus of insight generation from existing data rests on the user. However, as businesses grow in size and different groups of users attempt to extract information from astronomical amounts of data in diverse ways, not all users adhere to established rules or understand the quality of data output. In addition, such systems are reactive rather than proactive: they do not adapt to diverse user attributes or rapid and dynamic changes in user needs over time.

Furthermore, present-day enterprise users have relied heavily on mobile devices, web applications, and voice or text commanded chatbots to gain insight into their businesses. Such interfaces are preferred for their simplicity, portability, and interoperability, but only a limited amount of first level insights can be provided via predefined reports or data points. More complex analytics, customized reports, and smart visualizations still need to be obtained through a technology team of experienced data analysts, with wait times on the scale of days or even weeks. That is, there is a missing link to gain progressive analytic capability automatically in real-time, in the way that human minds work. What is more, while chatbots provide an interactive way to ask questions, a user unaware of, or untrained in data availability or the system vocabulary, syntactic, or semantics, cannot use such interfaces efficiently. In addition, existing chatbots often overlook underlying user attributes and intent, leading to unsatisfactory answers to user requests.

Therefore, in view of the aforementioned difficulties, there is an unsolved need to provide an artificial intelligence-based, human-like data insight platform that connects to enterprise systems, interacts with, understands, and adapts to user requests, provides complex analytics and smart visualizations, and turns unused data into valuable insights proactively in real-time.

BRIEF SUMMARY OF THE INVENTION

This summary is provided to introduce a selection of disclosed concepts in a simplified form that are further described below in the detailed descriptions including the drawings provided. This summary is not intended to identify key features or essential features of the claimed subject matter. Nor is this summary intended to be used to limit the claimed subject matter's scope.

Exemplary method and systems are provided below for a context and intent-based, artificial intelligence-supported natural language processing platform that synthesizes knowledge and generates insights from both structured and unstructured data.

More specifically, in one aspect, one embodiment of the present invention is a natural language processing system for generating a data insight response to a user request, comprising a processor and a non-transitory, computer-readable storage medium for storing program code, wherein the program code when executed by the processor, causes the processor to generate a knowledge graph using a knowledge graph builder module, based on structured data, wherein the knowledge graph is a network comprising a plurality of entities and a plurality of relationships among the plurality of entities; generate a word embedding using a word embeddings generator module, based on unstructured data, wherein the word embeddings generator module comprises an artificial neural network; receive the user request from a user; extract a semantic meaning from the user request; determine at least one user attribute and a user context, wherein the at least one user attribute comprises at least one of a domain, a group, a security level and a vocabulary associated with the user; determine one or more matching entities and one or more matching relationships on the knowledge graph that match the semantic meaning, based on the user attribute, the user context, and the word embedding; generate a sequence of analytical instructions from the one or more matching entities and the one or more matching relationships; and generate the data insight response to the user request by applying the sequence of analytical instructions to the structured data.

In some embodiments, the program code to determine the one or more matching entities and the one or more matching relationships on the at least one knowledge graph, when executed by the processor, further causes the processor to determine that no entity can be found on the knowledge graph to match the semantic meaning based on the user attribute and the user context; provide a plurality of options to the user; receive a user selection from the plurality of options; and update, based on the user selection, at least one of the knowledge graph, the word embedding, the vocabulary associated with the user, and a syntactic and semantic database.

In some embodiments, the program code to provide a plurality of options to the user, when executed by the processor, further causes the processor to determine whether a sentence structure of the user request exists in a seen syntactic and semantic database; in response to determining that the sentence structure of the user request exists in the seen syntactic and semantic database, identify at least one closest matching entity on the knowledge graph, based on the word embedding, and generate a first sentence with a tag of vocabulary dismatch, based on the at least one closest matching entity; and in response to determining that the sentence structure of the user request does not exist in the seen syntactic and semantic database, use a sentence similarity to generate at least one semantically close sentence template, and generate a second sentence with a tag of sentence dismatch, based on the at least one semantically close sentence template, wherein the plurality of options is generated based on the first sentence or the second sentence.

In some embodiments, the determination of the user context is based on at least one of the user request and a past user request.

In some embodiments, the knowledge graph is specific to the domain, an enterprise, the group, or the user.

In some embodiments, the program code to extract the semantic meaning from the user request, when executed by the processor, causes the processor to construct a plurality of candidate semantic meanings from the user request; and select one of the plurality of candidate semantic meanings based on the knowledge graph and the word embedding.

In some embodiments, the structured data comprises at least one of transactional data, financial data, operational data, and domain-specific metrics.

In some embodiments, the unstructured data comprises at least one of articles, catalogues, manuals, domain-specific knowledge graphs, enterprise-specific knowledge graphs, and user-specific knowledge graphs.

In some embodiments, the program code when executed by the processor, further causes the processor to determine a format of the data insight response, based on at least one of the user attributes and the user request.

In another aspect, one embodiment of the present invention is a computer-implemented method utilized by a natural language processing system for generating a data insight response to a user request, the method executable by a processor, the method comprising the steps of generating a knowledge graph using a knowledge graph builder module, based on structured data, wherein the knowledge graph is a network comprising a plurality of entities and a plurality of relationships among the plurality of entities; generating a word embedding using a word embeddings generator module, based on unstructured data, wherein the word embeddings generator module comprises an artificial neural network; receiving the user request from a user; extracting a semantic meaning from the user request; determining at least one user attribute and a user context, wherein the at least one user attribute comprise at least one of a domain, a group, a security and a vocabulary associated with the user; determining one or more matching entities and one or more matching relationships on the knowledge graph that match the semantic meaning, based on the user attribute, the user context, and the word embedding; generating a sequence of analytical instructions from the one or more matching entities and the one or more matching relationships; and generating the data insight response to the user request by applying the sequence of analytical instructions to the structured data.

In some embodiments, the determining the one or more matching entities and the one or more matching relationships on the at least one knowledge graph comprises the steps of determining that no entity can be found on the knowledge graph to match the semantic meaning based on the user attribute and the user context; providing a plurality of options to the user; receiving a user selection from the plurality of options; and updating, based on the user selection, at least one of the knowledge graph, the word embedding, the vocabulary associated with the user, and a syntactic and semantic database.

In some embodiments, the providing a plurality of options to the user further comprises the steps of determining whether a sentence structure of the user request exists in a seen syntactic and semantic database; in response to determining that the sentence structure of the user request exists in the seen syntactic and semantic database, identifying at least one closest matching entity on the knowledge graph, based on the word embedding, and generating a first sentence with a tag of vocabulary dismatch, based on the at least one closest matching entity; and in response to determining that the sentence structure of the user request does not exist in the seen syntactic and semantic database, using a sentence similarity to generate at least one semantically close sentence template, and generating a second sentence with a tag of sentence dismatch, based on the at least one semantically close sentence template, wherein the plurality of options is generated based on the first sentence or the second sentence.

In some embodiments, determining of the user context is based on at least one of the user request and a past user request.

In some embodiments, the knowledge graph is specific to the domain, an enterprise, the group, or the user.

In some embodiments, the extracting of the semantic meaning from the user request comprises the steps of constructing a plurality of candidate semantic meanings from the user request; and selecting one of the plurality of candidate semantic meanings based on the knowledge graph and the word embedding.

In some embodiments, the structured data comprises at least one of transactional data, financial data, operational data, and domain-specific metrics.

In some embodiments, the unstructured data comprises at least one of articles, catalogues, manuals, domain-specific knowledge graphs, enterprise-specific knowledge graphs, and user-specific knowledge graphs.

In some embodiments, the computer-implemented method further comprises the step of determining a format of the data insight response, based on at least one of the user attribute and the user request.

In yet another aspect, one embodiment of the present invention is a non-transitory storage medium for storing program code, utilized by a natural language processing system, for generating a data insight response to a user request, wherein the program code is executable by a processor, and wherein the program code when executed by the processor causes the processor to generate a knowledge graph using a knowledge graph builder module, based on structured data, wherein the knowledge graph is a network comprising a plurality of entities and a plurality of relationships among the plurality of entities; generate a word embedding using a word embeddings generator module, based on unstructured data, wherein the word embeddings generator module comprises an artificial neural network; receive the user request from a user; extract a semantic meaning from the user request; determine at least one user attribute and a user context, wherein the at least one user attribute comprise at least one of a domain, a group, a security and a vocabulary associated with the user; determine one or more matching entities and one or more matching relationships on the knowledge graph that match the semantic meaning, based on the user attribute, the user context, and the word embedding; generate a sequence of analytical instructions from—the one or more matching entities and the one or more matching relationships; and generate the data insight response to the user request by applying the sequence of analytical instructions to the structured data.

In some embodiments, the program code to determine the one or more matching entities and the one or more matching relationships on the at least one knowledge graph, when executed by the processor, further causes the processor to determine that no entity can be found on the knowledge graph to match the semantic meaning based on the user attribute and the user context; provide a plurality of options to the user; receive a user selection from the plurality of options; and update, based on the user selection, at least one of the knowledge graph, the word embedding, the vocabulary associated with the user, and a syntactic and semantic database.

Other embodiments of the present invention include systems, servers, and non-transitory storage media storing program code to execute the steps described herein. Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive.

Embodiments will now be described, by way of examples, with reference to the accompanying drawings, in which.

DETAILED DESCRIPTION

Figure 1:
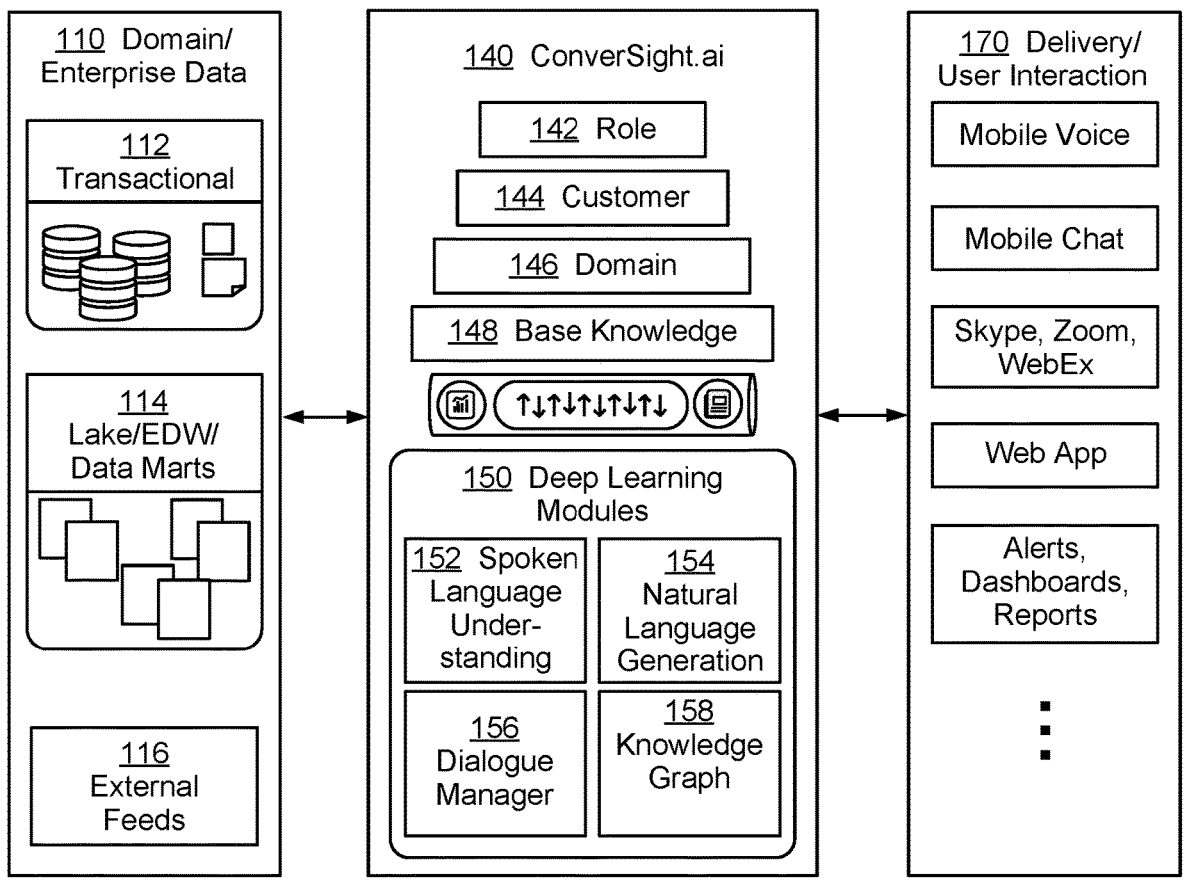
FIG. 1 is an exemplary architecture diagram showing an artificial intelligence (AI)-based, conversational insight and action platform for user context and intent-based natural language processing and data insight generation, according to one embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

CONVERSIGHT and CONVERSIGHT.AI are trademark names carrying embodiments of the present invention, and hence, the aforementioned trademark names may be interchangeably used in the specification and drawings to refer to the products and/or services offered by embodiments of the present invention. The term CONVERSIGHT may be used in this specification to describe the artificial intelligence-based conversational insights and action platform, individual systems or modules for natural language processing, deep learning, adaptive learning, data analytics generation, and smart visualization, as well as the company providing said platforms, systems, processes, or services. With reference to the figures, embodiments of the present invention are now described in detail.

Overview and Introduction

Broadly, embodiments of the present invention relate to methods and systems for an artificial intelligence (AI)-based conversational insight and action platform. More specifically, the CONVERSIGHT conversational AI system builds a knowledge base by learning domain, industry, enterprise, group, and/or person-specific vocabularies and entity relationships from the combination of structured and unstructured data, then combines natural language processing, deep learning, data science, and cognitive techniques to understand user requests, synthesize knowledge, and deliver personalized insights, actions, and analytics, through one or more smart interfaces. Building further on the interactive nature of human conversations, the system adaptively learns previously unseen user vocabularies, semantics, and syntax, and infers user context and intent to help accurately understand user inputs and insight requests. That is, the CONVERSIGHT system constructs and continuously enriches its knowledge base and knowledge graphs, and utilizes such knowledges to understand data and to understand user vocabularies, while through these processes taking over, from end users, the burden of learning specific jargons and generating analytics from existing data, thus enabling non-trained users to easily adopt and to extract valuable insights from large amounts of data with minimal delay.

More particularly, today's enterprise users largely employ mobile apps, web applications, and chatbots to gain insights into their businesses. Mobile and web applications can provide a first level of coarse insight with predefined reports or singular data points, but more complex insights or analytics require end users to sift through multiple complex pages of lengthy reports prepared by experienced data analysts to find key desired insights, thereby missing crucial time and wasting the progressive analytical capability of individual human minds. On the other hand, chatbots offer a smarter question-answer (QA) interaction interface, yet users unfamiliar with underlying data may not ask the right questions to obtain the desired answers, and may be unaware of insights that can be accessed via the chatbot interface.

Furthermore, end users from different domains, and trained for different specializations or professions may use very different terms, vocabularies, semantics, or even different syntax in asking the same question. For example, even within the same company or organization, vital differences may exist in terminologies from one department to another: the common term "sales" may be referred to as "revenue" or "gross revenue," and an "order" by an order management user in a supply chain may be referred to as a "shipment" by warehouse users or as a "load" by truck drivers. Techniques such as inverted index lookup, fuzzy search on unstructured data, finite state transducer based autocompletion and synonym lookup have been tried in solving the aforementioned problems, but typically without taking into account of user context, or domain and enterprise-specific vocabularies. The rigidity and non-human like nature of these techniques also stem from their need for carefully created test datasets and predefined vocabularies very specific to individual use cases that make them hard to use in practice.

Disclosed herein are embodiments of an improved artificial intelligence (AI) and natural language processing (NLP)-based conversational insight and action system that learns vocabularies and contexts from user inputs and uses semantic similarities in understanding user questions. The CONVERSIGHT system provides for a horizontal platform cutting across different segments of business functions and industrial domains. An ensemble method of deep learning and structured entity graphs from the digestion of domain and enterprise structured and unstructured data helps any non-trained user to adapt quickly with minimal need for remembering new or specific j argons.

A first feature of the CONVERSIGHT conversational AI system is the creation and use of a knowledge base, built using deep learning over the aggregation, assimilation, combination, and integration of both unstructured and structured data. Such a knowledge base comprises one or more data entity relationship graphs or knowledge graphs, and one or more word embeddings that measure semantic similarities among different words. That is, the system learns the data, and learns necessary vocabularies for accessing the data. Exemplary unstructured data include domain-specific articles, financial statements, news, and enterprise-specific articles, newsletters, product manuals, emails, and the like. Exemplary structured data include indexed or tabulated enterprise database information from customer relationship management (CRM) systems, enterprise resource planning (ERP) systems, and the like. Adaptive learning is then utilized under specific user contexts and specific user intents during user interactions with the CONVERSIGHT system to further update and improve the knowledge base.

A Second feature of the CONVERSIGHT conversational AI system is in using the knowledge base to understand what is being asked by a user through one or more requests, and the design of intelligent conversations to progressively update and enforce the knowledge base based on user responses to additional prompts. Conversations without grounded knowledge and context are just a chatter. For example, a question like "how about India" has very different meanings when asked in a conversation about sales statistics versus in a conversation about average daily temperatures. Intelligent conversations are instead centered on context, intent, and specialized domain, enterprise, group, and subject knowledge. The CONVERSIGHT conversational AI system analyzes user context and intent embedded in user requests, and uses such information to assist in understanding what the user requesting. Furthermore, when new terminologies or unclear meanings are encountered, the system provides to the user semantically similar vocabulary suggestions or syntactically similar sentence suggestions that have been generated based on, or extracted from, its knowledge base. As additional user responses to these prompts are received, the knowledge base is progressively updated and complemented with new information collected from the intelligent conversation.

A third feature of the CONVERSIGHT conversational AI system is the automated generation of actionable insights using its knowledge base. CONVERSIGHT's data entity relationship graphs or knowledge graphs encode not only semantic data, but also quantitative data such as transactional data, metrics, enterprise-class security and role-based access directives, as well as analytical languages, instructions and functions that may be assembled and run to probe structured databases to automatically synthesize data, knowledge, and insights.

Yet another feature of the CONVERSIGHT conversational AI system is its smart interfaces and service channels. Intelligent conversations can be carried out in the form of voice or text, in different channels like traditional web or mobile applications, along with modern voice-first devices such as Alexa and Google Home. Insights output by the system may be presented in the form of text, voice, graphs, images, animations, and/or videos, as alerts, reports, or any other appropriate format, through one or more user interfaces.

In short, the CONVERSIGHT conversational AI platform combines machine learning, adaptive learning, natural language processing, data science, and cognitive techniques to offer a solution that alleviates the pain for users to remember vocabularies and data structures when inquiring insights from large amounts of data in their day-to-day work. The system intelligently learns by usage to help different users obtain insights and analytics even when vocabularies used are domain, enterprise, or user-specific. The resulting reduced dependency on user training and data quality, and increased accuracy and personalization of the delivered insights can significantly increase productivity when users try to make informed decisions based on such insights.

In what follows, a system architecture of an exemplary embodiment of the CONVERSIGHT conversational AI platform is first presented, followed by illustrative use cases and user interface designs, before different modules within the system are described in detail.

System Architecture

FIG. 1 is an exemplary architecture diagram 100 showing an artificial intelligence (AI)-based, conversational insight and action platform or system for user context and intent-based natural language processing and data insight generation, according to one embodiment of the present invention. In this illustrative example, input data 110 to CONVERSIGHT platform 140 may be domain or enterprise-specific, and may comprise both unstructured and structured data.

Exemplary unstructured data include, but are not limited to, free text in web articles, reports such as financial statements, enterprise newsletters and domain news from various online or offline sources, product manuals, emails or records of other forms of communications exchanged between employees of an organization, and the like, some of which may come from external feeds 116, while some of which may be generated internally within the organization. In this disclosure, a "domain" may refer to a particular field, realm, or range of knowledge, thought, actions, business, or professions, such as the business field of apparel retail, or the medical field of oncology. An "enterprise," on the other hand, may refer to a project, program, institution, company, firm, or organization that has been established for particular purposes. A "user" to system 140 may refer to a human member of a domain or an enterprise, who uses system 140 for insight extraction, or may refer to a non-human entity that is capable of interacting with system 140 in any fashion similar to a human user.

Exemplary structured data include, but are not limited to, transactional data 112, other indexed, searchable enterprise database information such as customer data, financial data and/or operational data from data lake/enterprise data warehouse (EDW) or data marts 114, from similar customer relationship management (CRM) systems, enterprise resource planning (ERP) systems, and the like.

Within CONVERSIGHT system 140, deep learning and data science modules 150 build one or more knowledge bases from input data 110. Each knowledge base may comprise one or more word embeddings, and one or more knowledge graphs. Such knowledge bases or knowledge graphs may be built in a hierarchical manner, starting from base knowledge 148, and become more tailored to individual domains 146, enterprises or customers 144, roles 142, group of users, and individual users, as more data are examined. Exemplary modules include, but are not limited to, a spoken language understanding model 152 for semantic data interpretation and for understanding user intent and questions, a natural language generation module 154 for intelligent conversation generation, a dialogue manager 156 for user interaction control, and a knowledge graph builder 158 which may function within a knowledge base builder module (not shown), for building one or more knowledge graphs that are utilized by other modules such as 152 and 154. While not shown, system 140 may comprise data analytics components and smart visualization components as well.

In some embodiments, each of modules 152, 154 and 156 may be connected to insight delivery and user interaction interfaces 170, which may include one or more of a mobile voice interface, a mobile chat interface, third-party application interfaces such as Skype, Zoom, and WebEx, web applications interfaces, as well as other smart visualization interfaces that provide alerts, dashboards, and/or detailed reports to a user. A dashboard may comprise specifically selected informational or actionable items, and may be accessed or shared dynamically or statically. In some embodiments, insight delivery and user interaction interfaces 170 may be personalized and adapted to specific user needs.

An Illustrative Case Study for the CONVERSIGHT Conversational AI Platform

Before diving into details of the system design, an illustrative case study is present in this section to show how the CONVERSIGHT conversational AI platform can provide significant benefits to enterprise customers.

In one example, a package material distributor needs to provide real-time supply chain insights from its ERP system while reducing the dependency from ERP vendors on reporting to reduce cost. Inventory and purchase costs need to be monitored across 600 products, more than 300 vendors, and three warehouses, and actionable insights need to be provided in a cost-effective fashion.

The CONVERSIGHT platform provides voice and text-based conversational insights through multiple channels including a mobile application, a web application, and Google Home. Both real-time and historical insights can be provided without dependency on the ERP IT team, with the ability to share data with other stakeholders without additional emails or spreadsheet reports. With key metrics and proactive intelligence provided around margin erosion and delinquent purchase orders, the system is able to bring 70% decrease in report creation cost, 20% decrease in operation cost through proactive monitoring on key metrics such as revenue leakage and cost avoidance, and 80% time savings for ad hoc insight queries.

Exemplary User Interfaces for Insight Visualization and User Context Learning

Figure 2A:
FIG. 2A is an illustrative graphical user interface (GUI) as part of a voice-based user interaction interface, according to one embodiment of the present invention.
Figure 2B:
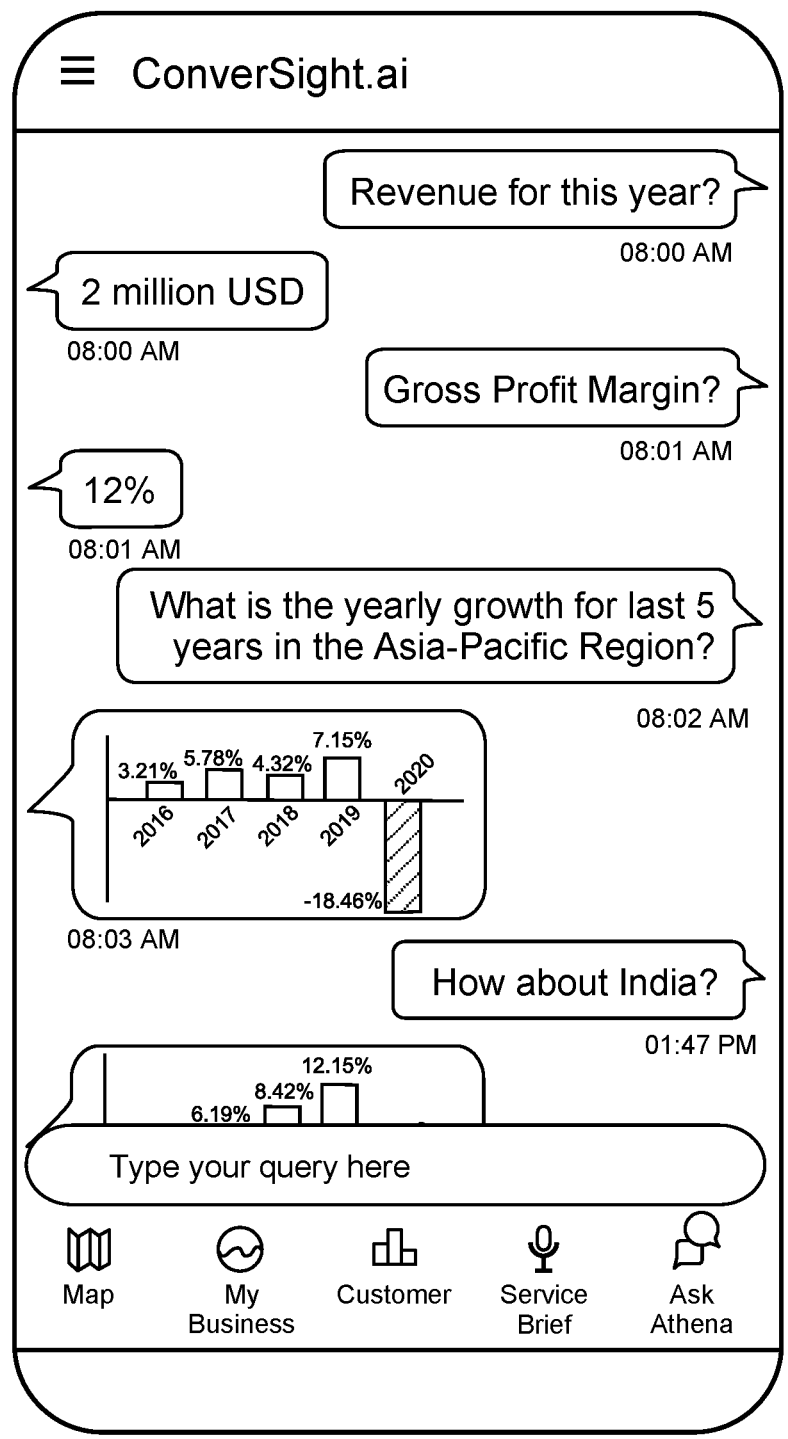
FIG. 2B shows an illustrative conversation through a chatbox GUI, where enterprise data insights are provided in response to user requests, according to one embodiment of the present invention.
Figure 2C:
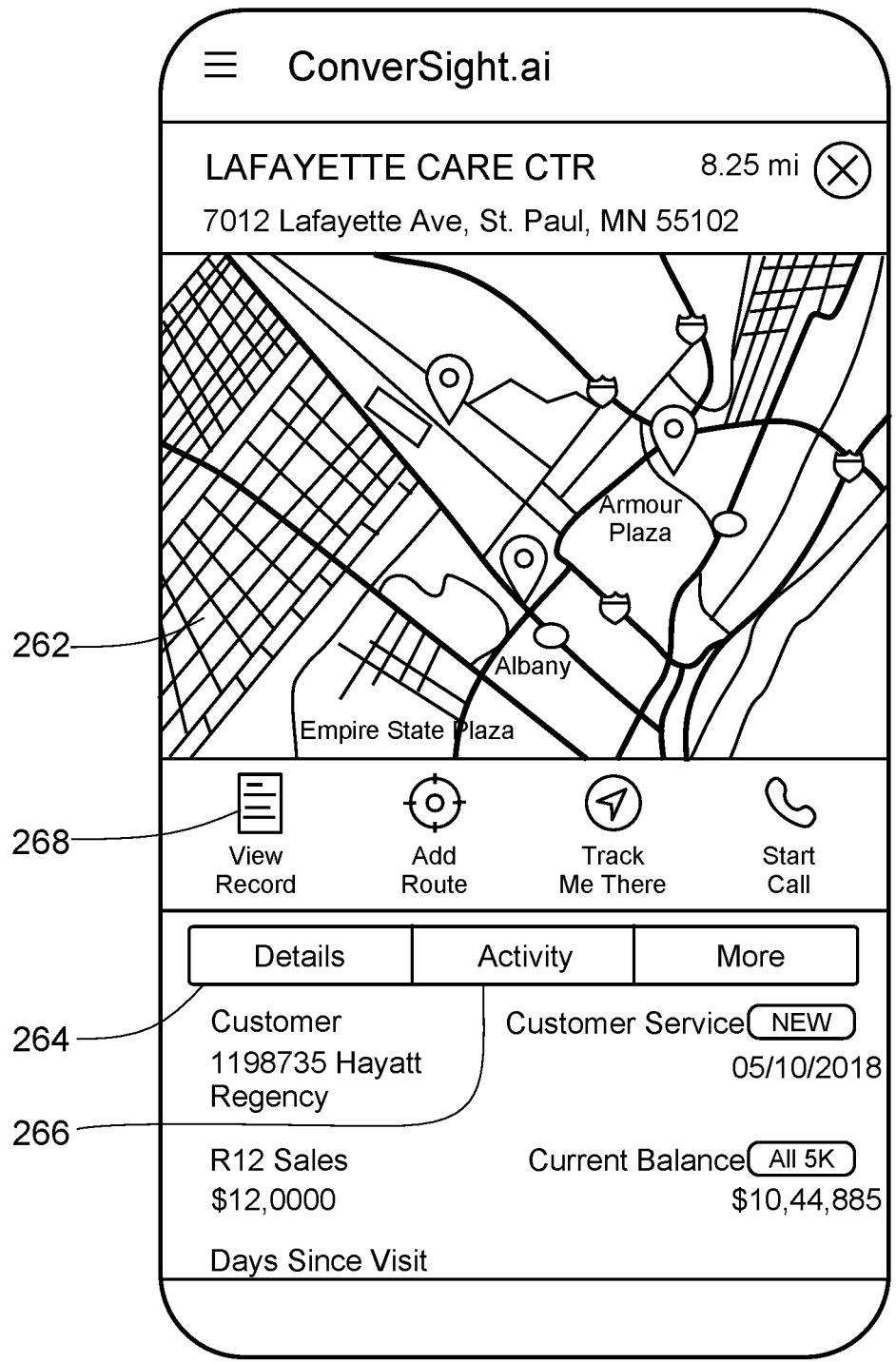
FIG. 2C shows an illustrative map-based GUI on which requests for and responses to user data insights may be provided, according to one embodiment of the present invention.

As illustrative examples of the insight delivery and user interaction interfaces 170, FIGS. 2A, 2B, and 2C are described next, without limiting the scope or applications of the present invention.

FIG. 2A is an illustrative graphical user interface (GUI) 200 as part of a voice-based user interaction interface, according to one embodiment of the present invention. GUI 200 may be activated for receiving one or more user requests via voice input. Voice output or other user interaction interfaces may be used to deliver results based on the nature of insights to be conveyed to the user in response to the voice input. In this embodiment, GUI 200 includes buttons 202 for activating other interaction interfaces such as graphs, texts, and chatbots.

FIG. 2B shows an illustrative conversation by a sales manager with CONVERSIGHT system 140 through a chatbox GUI 230, where enterprise data insights are provided in response to user requests, according to one embodiment of the present invention. In this illustrative example, as a user keys in questions, system 140 determines the desired insights using its internal knowledge base, and provides matching answers via chatbot interface 230, in the form of singular data points or in the form of bar charts when appropriate. Here the user starts his or her inquiries with a question on revenue for the year. Although not shown explicitly in FIG. 2B, system 140 may be able to first determine user attributes such as a role within his or her company, and access rights or security levels to specific company data, then generate insights under these user attribute constraints. As in a human conversation, when the first user question "revenue for this year?" is asked, analysis of the question itself may establish a user context, which may be {revenue} or {revenue for this year}, depending on specific system implementation choices. System 140 may also default the user context to enterprise level or company-wide, such that "2 million USD," over the entire company, is provided as an answer.

Subsequent questions may be interpreted in view of the current user context, or may themselves update or change this user context. For example, the second question of "gross profit margin?" may shift the context of the conversation to gross profit margin for the entire company in the current year, while the third question of "what is the yearly growth for last 5 years in the Asia-Pacific Region?" may be interpreted by system 140 in view of this updated user context. That is, system 140 may interpret the third question as asking for the yearly growth in gross profit margin for the last 5 years in the Asia-Pacific Region. Similarly, the fourth question "how about India?" may be interpreted as asking for the yearly growth in gross profit margin for the last 5 years in India. Furthermore, user intent upon a question such as the last one may be inferred by system 140 from the question's semantic meaning and the current user context, to be that the user is inquiring on profit growth in a particular region over a particular time period. Based on system 140's understanding of each question in view of current user context and intent, system 140 generates insight responses accordingly and presents the generated insights in appropriate formats.

Furthermore, FIG. 2B shows additional buttons on the bottom that the user may click to access other interfaces such as voice inputs or a map over which a region may be chosen, to conduct requests while system 140 provides responses via chatbot interface 230 shown in FIG. 2B. That is, system 140 may seamlessly switch between different interaction interfaces based on the optimal communication choice to receive user requests and to convey insight responses.

FIG. 2C shows an illustrative map-based GUI 260 on which requests for and responses to user data insights may be provided, according to one embodiment of the present invention. Such an interface may allow a sales person to access simple insights such as customer locations within a map area 262 and customer details 264. Other tabs or pages such as 266 and 268 may also be provided to access customer activities stored locally within system 140, or other detailed customer records that may be retrieved from a third-party database coupled or connected to system 140. Additional tabs or buttons are also provided to facilitate mapping functions such as adding a route, tracking, and calling the customer directly.

Conversational Insights and Action Platform

Figure 3:
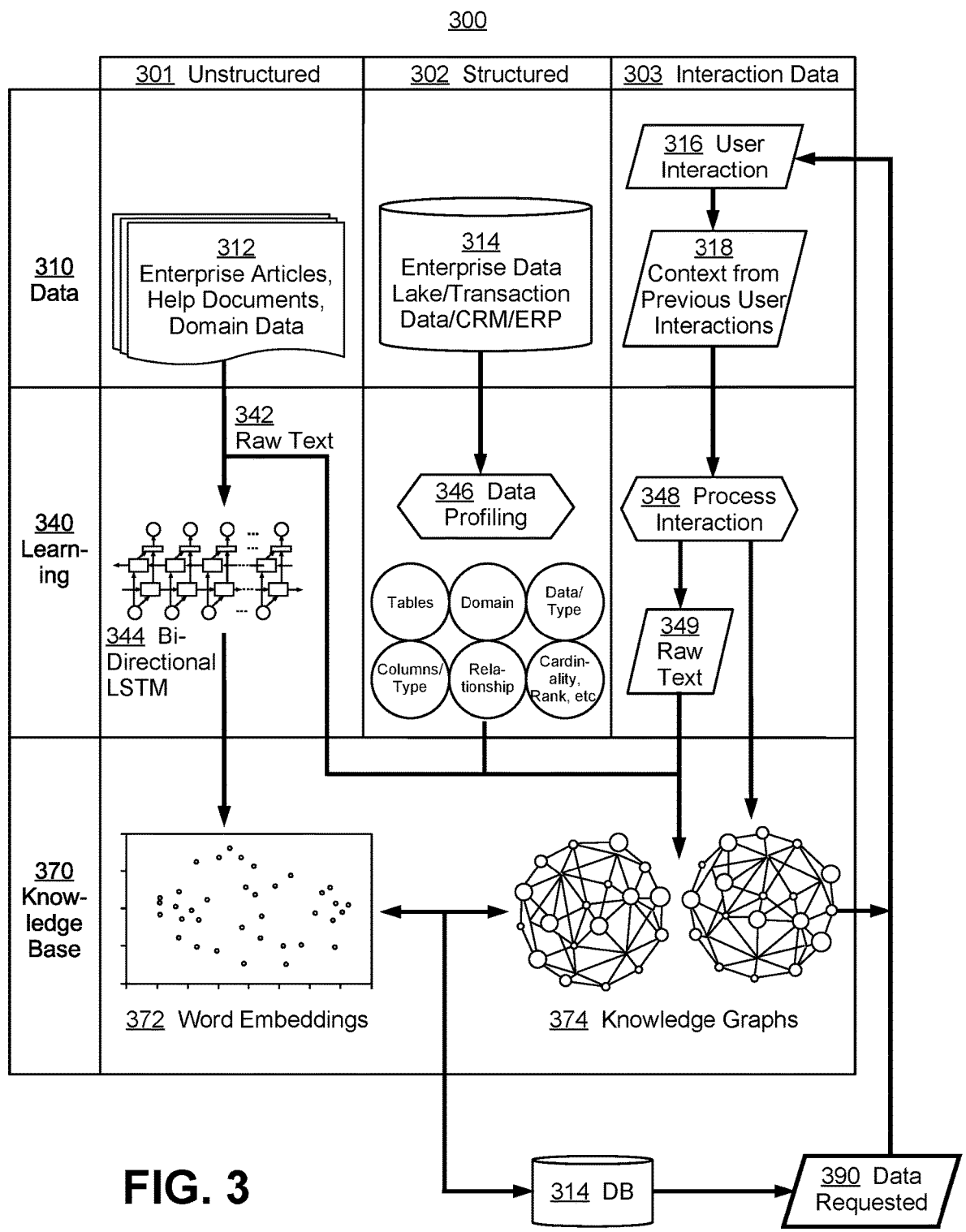
FIG. 3 is an exemplary schematic diagram for implementing an AI-based conversational insight and action platform for user context and intent-based natural language processing and data insight generation, according to one embodiment of the present invention.

FIG. 3 is an exemplary schematic diagram 300 for implementing the CONVERSIGHT conversational AI insight and action system or platform 140 for user context and intent-based natural language processing and data insight generation, according to one embodiment of the present invention. In this illustrative embodiment, machine learning 340 is performed on input data 310 to establish a knowledge base 370, which is in turn employed in understanding user interaction data 303 and in generating insight data 390 in response to a use request. Adaptive learning may also be performed over user interaction data 303 to progressively update knowledge base 370.

More specifically, input data 310 may comprise both unstructured data 301 and structured data 302. Structure data typically have pre-defined types and formats, with patterns that make them easily indexed into searchable, relational databases. In FIG. 3, structured data 302 are stored in exemplary databases 314 such as enterprise data lakes, transactional data databases, CRM, ERP, and similar systems. For instance, inventory databases, airline reservation systems, and online banking transaction processing systems all manage structured data. Examples of structured data may include, but are not limited to, transactional data, financial data, operational data, and domain-specific or enterprise-specific metrics. Structured Query Language (SQL), Python, or other analytical languages may be used to query structured data within relational databases.

On the other hand, unstructured data may include every other form or type of data, which do not have a pre-defined data model or schema, are not organized or written according to a pre-defined format, or are not stored in a structured database format. Unstructured data may be textual or non-textual, may be human generated or machine generated, and may include different media formats such as alphanumeric, graphics, video, and audio. In FIG. 3, unstructured data 301 are shown as individual files 312. Examples of unstructured data may include, but are not limited to, articles such as news reports, media postings, and transcripts, catalogues, manuals, reports, domain-specific knowledge graphs, enterprise-specific knowledge graphs, user specific knowledge graphs, SMS messages and emails or records of other forms of communications exchanged between humans or non-human entities, video interviews, podcasts, and the like. Unstructured data may have internal structures themselves, while not having systematic structures in pre-defined models or formats. Both structured and unstructured data may be public or private, may be available via online or offline sources, and may have different access levels, such as within the public domain, a professional domain, or within an enterprise or a group of users.

With each piece of input data 301 or 302, the system may first determine whether the data is unstructured or structured. Unstructured data 301 may be analyzed or studied through a knowledge base builder that may parse, tokenize, and profile the input, before feeding the processed data or raw text data 342 into a deep learning module such as an artificial neural network. In FIG. 3, a bi-directional long short-term memory (LSTM) network 344 is used to generate a word embedding 372. A word embedding is derived from natural language processing techniques to map words and phrases from a vocabulary into vector representations such that words with similar meanings are closer in distance to each other. More details on exemplary knowledge base builder designs, bi-directional LTSMs, and word embeddings are provided in reference to FIGS. 5, 6 and 7, respectively.

In the case of structured data 302, data ingestion and profiling 346 is performed first to review, analyze, and understand data structure, content, and interrelationships. Exemplary data profiling processes include, but are not limited to, collecting descriptive statistics such as minimums, maximums, counts, modes, percentiles, and distributions across data tables or data columns; collecting metadata information such as data types, lengths, cardinalities, and ranks; tokenizing and/or tagging data with categories or descriptions; validating data consistency and discovering any data error and problems; and discovering interrelationships among different parts of the data, such as among and across database tables, columns, cells, descriptive statistics, and metadata.

Based on structured data profiling results and extracted raw textual data 342 from any unstructured data, one or more knowledge graphs 374 may be constructed. A knowledge graph is a data entity relationship graph made of vertices connected by edges. Each vertex or node represents a data entity, and each edge or link represents a relation between two nodes connected by the edge. For example, two data entities (Name: John) and (Role: Manager) may be connected by an edge to convey the knowledge that John is a Manager. Nonetheless, data entity relationships in knowledge graphs 374 are not limited only to the {subject, predicate, object} semantic triple which codifies semantic data into a statement. Instead, knowledge graphs in embodiments of the present invention may also include entity nodes that represent transactional data, quantitative metrics, or analytical languages that can be run and applied upon structured data associated with connected entity nodes. For example, an analytical function $z=f(x, y)$ may be represented by a node that is connected to two input entities x and y, and one output entity z, while SQL instructions for running such an analytical function $f$ may be provided by the node. Exemplary enterprise-specific knowledge graphs are discussed with reference to FIGS. 8, 9A and 9B, respectively.

As discussed with reference to system 140 shown in FIG. 1, in some embodiments, knowledge base 370 may be built hierarchically on multiple sources of information. For example, a domain-specific knowledge graph may be built based on domain knowledge first, then individual knowledge graphs may be built for sub-domains based on the domain-specific knowledge graph by adding in sub-domain specific data entities and relationships. Similarly, enterprise-specific knowledge graphs may be built from domain-specific knowledge graphs by refining and enforcing domain-specific knowledge graphs with enterprise-specific data.

In various embodiments, knowledge base 370 is utilized in interacting with a user who is seeking data insights. In this disclosure, an insight may refer to one or more particular data items, or functions and knowledge that can be generated, inferred, or derived from available data items. The user may ask the system several questions, and answer questions or prompts from the system. The system in turn uses knowledge base 370 in interpreting such user interactions data 303. For example, given a user request 316, context and/or user intent 318 may first be extracted directly from the user request, or from previous user interaction data. In this illustrative embodiment, user interaction 316 may refer to user questions or requests to the system, or user answers or response to the system. One example of context and intent determination was provided in discussing FIG. 2B. With context data 318, the user request may be processed through a step 348 to determine its semantic meaning.

In some embodiments, one or more user attributes may also be determined from the user interaction data or from internal data associated with the user. User attribute data may include, but are not limited to, one or more of a domain or a group that the user belongs to, a security level for the user, and a vocabulary associated with the user. A group that the user belongs to may refer to any organizational entity, such as an enterprise or an institution, a department or unit within an enterprise, a selected team of users such as those with a specific role or in a specific team, and the like. In various embodiments, a security level may refer to any security clearance or access right related metrics such as an alphanumeric score, a login credential, a digital authentication certificate, a data decryption key, or the like, that can be used to indicate which sets of data, and/or insight generation and presentation capabilities the user has access to.

Based on the one or more user attributes and context as determined above, the semantic meaning of the given user request may be compared to one or more knowledge graphs 374 to find matching entities nodes and entity relationships, taking into account similarities in terminologies as given by word embeddings 372. For example, in the conversation shown in FIG. 2B, with the first question "revenue for this year?" the system may establish the context as {revenue, this year}, and a user attribute of {group: sales manager, security level: access right to company-wide data}. When the second question "gross profit margin?" is asked by the user, the system may extract the semantic meaning as {gross, profit, margin}, and this semantic meaning compared to entities in a knowledge graph 374, under the assumption that the user is asking for the gross profit margin for this year and the user has access to company-wide data. In some embodiments, an enterprise-specific knowledge graph may be selected from all established knowledge graphs 374 for the comparison. Depending on the content of unstructured data 301 and structured data 302 used to build the knowledge graph, an exact match may or may not be found. For example, entity nodes may exist for yearly gross profits and an analytical function for computing profit margins, and a sequence of analytical instructions such as SQL commands may be generated based on these entity nodes and relationship between these nodes, such that when the analytical instructions are applied to company sales data from database 314, gross profit margin for this year can be computed. In another example, the knowledge graph may contain entity nodes for gross sales instead of gross profits, and word embeddings 372 may be utilized in the matching process to help determine that the desired gross profit margin can be computed based on gross sales and some other entity nodes, given profit and sales are similar in meaning. In addition, in some embodiments, determining matching entities nodes automatically implies matching entity relationships and vice versa, as edges can be implied from nodes they connect, and vice versa.

Moreover, if the system determines that no matching entity nodes and relationships can be found, the system may interact further with the user by providing one or more questions, prompts or options to the user to answer or select from. Exemplary questions may be in the form of "did you mean this" where the user has the options to say or choose yes or no, "did you mean A, or B, or C" where the user has the options to choose one of the three options given, or "which years of data do you want to see over 1980 to present" etc. That is, in some embodiments, direction questions or multiple choice questions given by the system may both be viewed as a plurality of options, explicit or implicit, for the user to choose from. The process flow shown in FIG. 3 thus returns from the knowledge base back to obtain new user interaction data 316, and such data are again processed through step 348, with additional matchings performed based on the new data. In addition, in some embodiments, characteristics and language usage of individual users or of the group a user belongs to may be extracted from the user interaction data, for example in the form of raw text data 349, and be used to update knowledge base 370. For example, user-specific vocabularies may be obtained and used to update word embedding 372 and/or one or more of the knowledge graphs 374.

While not shown in FIG. 3, the system may utilize various interaction interfaces including voice commands and instructions to collect and/or present user interaction data 316, and requested data 390. Exemplary interaction interfaces include, but are not limited to, a traditional keypad, a touch screen, a mouse, or a pointer. User interactions may come by way of a mobile application, a web application, or dedicated device with input and output means. Whichever access manner is used, the system determines the context and intent of the information being sought, not just the words written, to determine the data or insight being sought. All of the above elements combine to allow users synthesize knowledge from data, context and personalization, for the full extraction of value and insights from available data.

Figure 4:
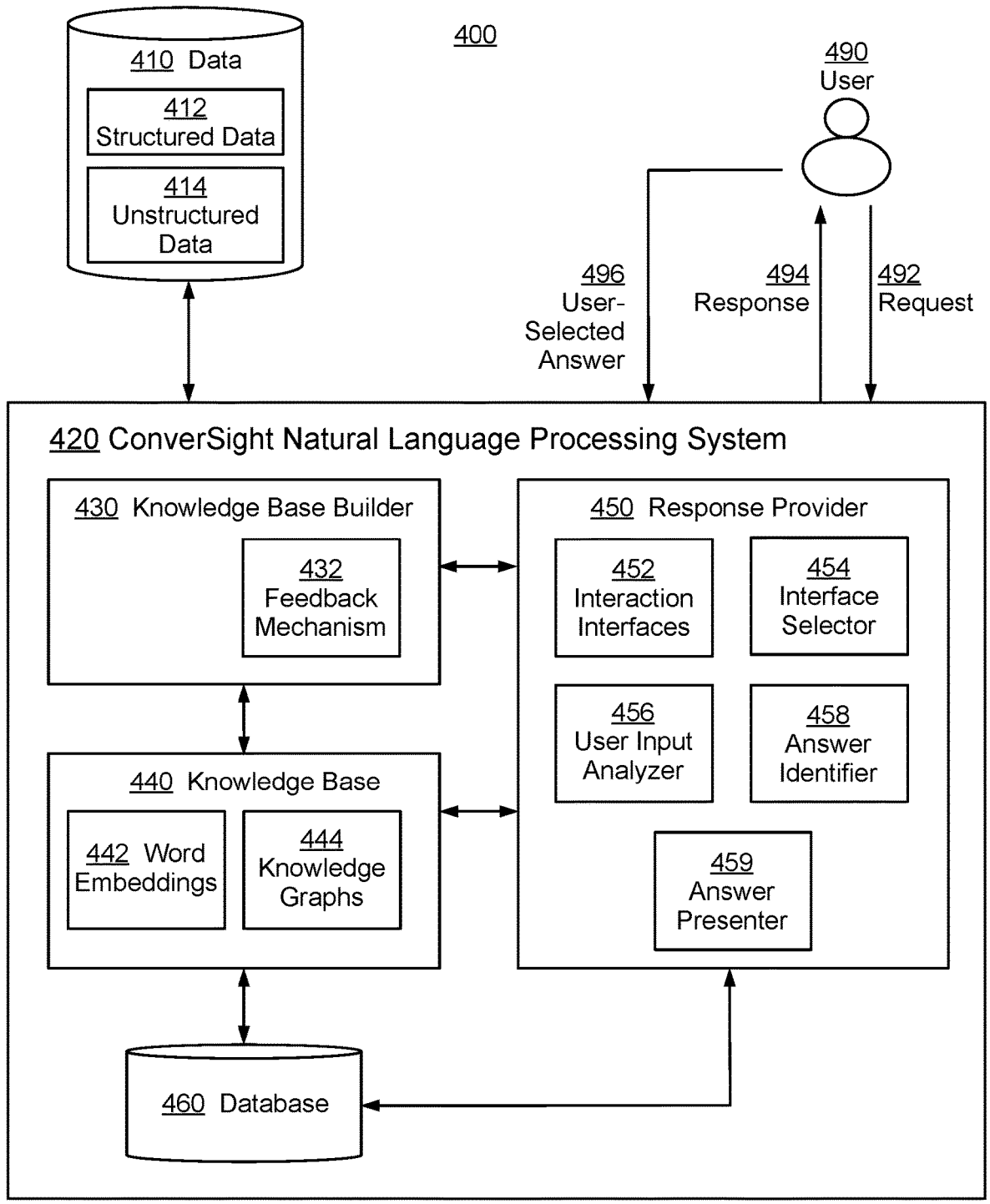
FIG. 4 is an exemplary system diagram for an AI-based conversational insight and action platform for user context and intent-based natural language processing and data insight generation, according to one embodiment of the present invention.

Corresponding to process steps and process flows shown in FIG. 3, FIG. 4 is an exemplary system diagram 400 for an AI-based conversational insight and action platform 420 for user context and intent-based natural language processing and data insight generation, according to one embodiment of the present invention. In this exemplary embodiment, system 420 receives a user 490's request 492 for information, such as a question or request for some particular data or insight in natural language, analyzes the request 492 and provides a response 496 in one or more different data modalities based on a nature of the user's question 492. System 420 includes a knowledge base builder 430, at least one knowledge base 440, and a response provider 450 comprising interaction interfaces 452, an interaction interface selector 454, a user input analyzer 456, an answer identifier 458, and an answer presenter 459. In addition, system 420 may comprise one or more internal databases 460 for storing syntactic and semantic databases, individual knowledge bases, enterprise-specific structured data, and the like.

When request 492 is received, user input or question analyzer 456 processes the request to extract semantic, context, and user data needed to frame a response. Such data is employed by answer identifier 458 to determine response 494 to request 492 using knowledge base 440. Response 494 is provided to user 490 via one of various interfaces 452 selected by interface selector 454. In some embodiments, response 494 may be provided to user 490 in the same modality which user 490 has employed to convey request 492. A modality may refer to a data format or a particular classification or channel of sensory interaction between a computer and a human, such as text, voice, graphics, or video through a keyboard, a pointing device, a touchscreen, through computer vision, speech recognition, motion and posture detection, and the like. In some embodiments, a plurality of interaction interfaces 452 may be simultaneously employed to provide response 492, depending on the type or form of insight data conveyed to user 490. For example, if response 494 includes natural language only, a voice or a text interface may be employed. However, if response 494 includes infographics, tables, graphs, etc., then a visual interface, such as a dashboard or a chat interface may be used. In some embodiments, the interface used may be specified as an attribute of the data being presented. In some embodiments, the interface used and the format of data response 494 may be determined based on at least one of user attributes and attributes of the original user request.

In some embodiments, knowledge base 440 includes one or more word embeddings 442 and one or more knowledge graphs 444 that are employed to generate answers or responses 494 to user 490's questions or requests 492. Knowledge base 440 may be generated by knowledge base builder 430 from data 410 which may include structured data 412 and unstructured data 414. Data 410 may be stored in one or more internal and external databases associated with system 420, or may be retrieved on-demand or offline from third-party databases. As discussed previously, structured data 412 may be accessed from data sources such as enterprise data lakes, transaction data databases, and software platforms such as customer relationship management (CRM) and enterprise resource planning (ERP) tools, etc. Unstructured data 414 may include enterprise articles, help documents, domain-specific data, communications exchanged via different communication tools such as emails, text messages, chats, etc., and the like.

Knowledge base builder 430 may determine the type of data from identifiers of data sources such as names and access strings for databases. Based on the type of input data 410, knowledge base builder 430 may employ data processing methods such as entity-relationship analysis to develop knowledge graphs 444 that represent data entities and relationships in-between data entities identified from structured data 412. In addition, deep learning techniques may be employed to develop word embeddings 442 from unstructured data 414.

When answer identifier 458 cannot identify an exact match for request 492, closest matches based on the semantic meaning of the extracted terms and/or user context and/or attribute may be identified from knowledge graphs 444 and word embeddings 442, and such matches may be used to generate one or more questions, prompts, or options for user 490, which in turn are provided to user 490 as an intermediate response 494. A user-selected answer 496 may be received and recorded by a feedback mechanism 432 included in knowledge base builder 420. This user-provided or user-selected answer 496 may be used by word embeddings 442 for further learning. System 420 therefore improves with usage as it learns through interaction and exposure to not only enterprise structured and unstructured data, but also user interaction data.

Figure 5:
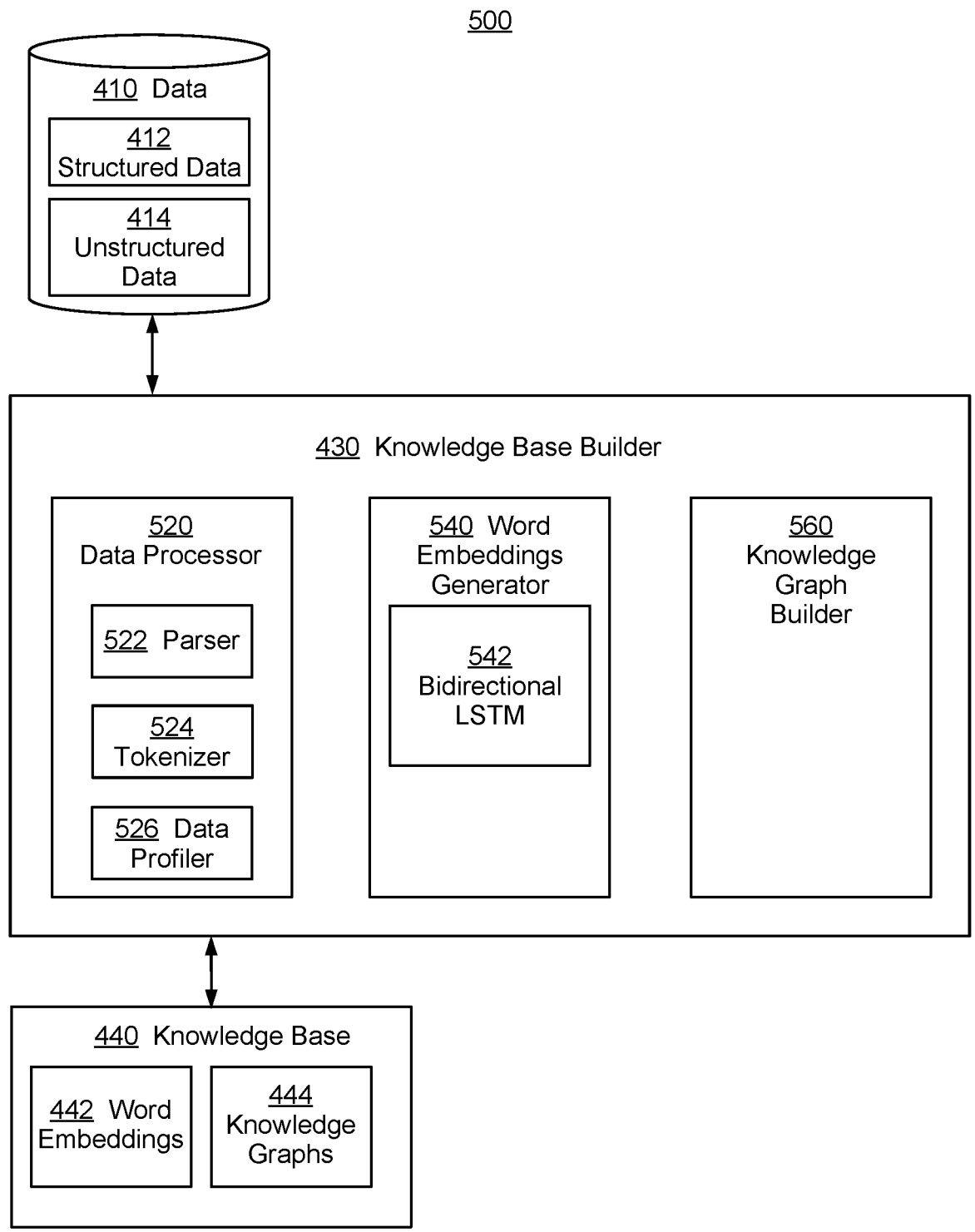
FIG. 5 shows a block diagram of a knowledge base builder module, according to one embodiment of the present invention.

FIG. 5 shows a block diagram 500 of the exemplary knowledge base builder module 430 shown in FIG. 4, according to one embodiment of the present invention. In this embodiment, knowledge base builder 430 comprises a data processor 520, a word embeddings generator 540, and a knowledge graph builder 560. Data processor 520 may include a parser 522, a tokenizer 524, and a data profiler 526. Data profiler 526 may perform data profiling processes 346 as discussed with reference to FIG. 3. For example, when structured data are received, data profiler 526 may identify various data structures such as tables, columns, data types, relationships, cardinality, ranks, relationships between the various column data, and the like. In addition, data profiler 526 may access user information in order to identify user 490 and retrieve user attributes, including user preferences. The user attribute data may include a domain in which user 490 operates such as finance, manufacturing, etc., a group that user 490 belongs too, a vocabulary or language use characteristics by user 490, prior requests from user 490, previous answers selected by user 490 or other team members of user 490, and other information that may aid in understanding request 492 and generating response 494 in return.

When unstructured data 414 is received, parser 522 may parse the input and tokenizer 524 may generate word tokens from the input by splitting large pieces of texts into words and phrases. Such word tokens may be further processed to identify metadata, such as a part of speech for each token, etc. These word tokens may be supplied to word embeddings generator 540. In some embodiments, word embeddings generator 540 includes one or more deep learning models, such as a bi-directional long short term memory (LSTM) neural network 542.

With structured data 412, information obtained by data profiler 526 may be used to generate one or more knowledge graphs 444 using knowledge graph builder module 560. In addition, word embeddings 442 generated from unstructured data 414 may also be used to assist in the generation of knowledge graphs 444. For example, knowledge graph builder 560 may be programmatically configured to identify, from a given piece of raw text, subject and object entities, and a type of relationship link between this pair of subject and object entities. In various embodiments, knowledge graph builder 560 may build domain-specific, enterprise-specific, group-specific, or user-specific knowledge graphs each pertaining to the particular domain, enterprise, group, or user. For example, separate knowledge graphs may be built for use by clients in the fields of manufacturing facilities, finance, or human resources.

Figure 6:
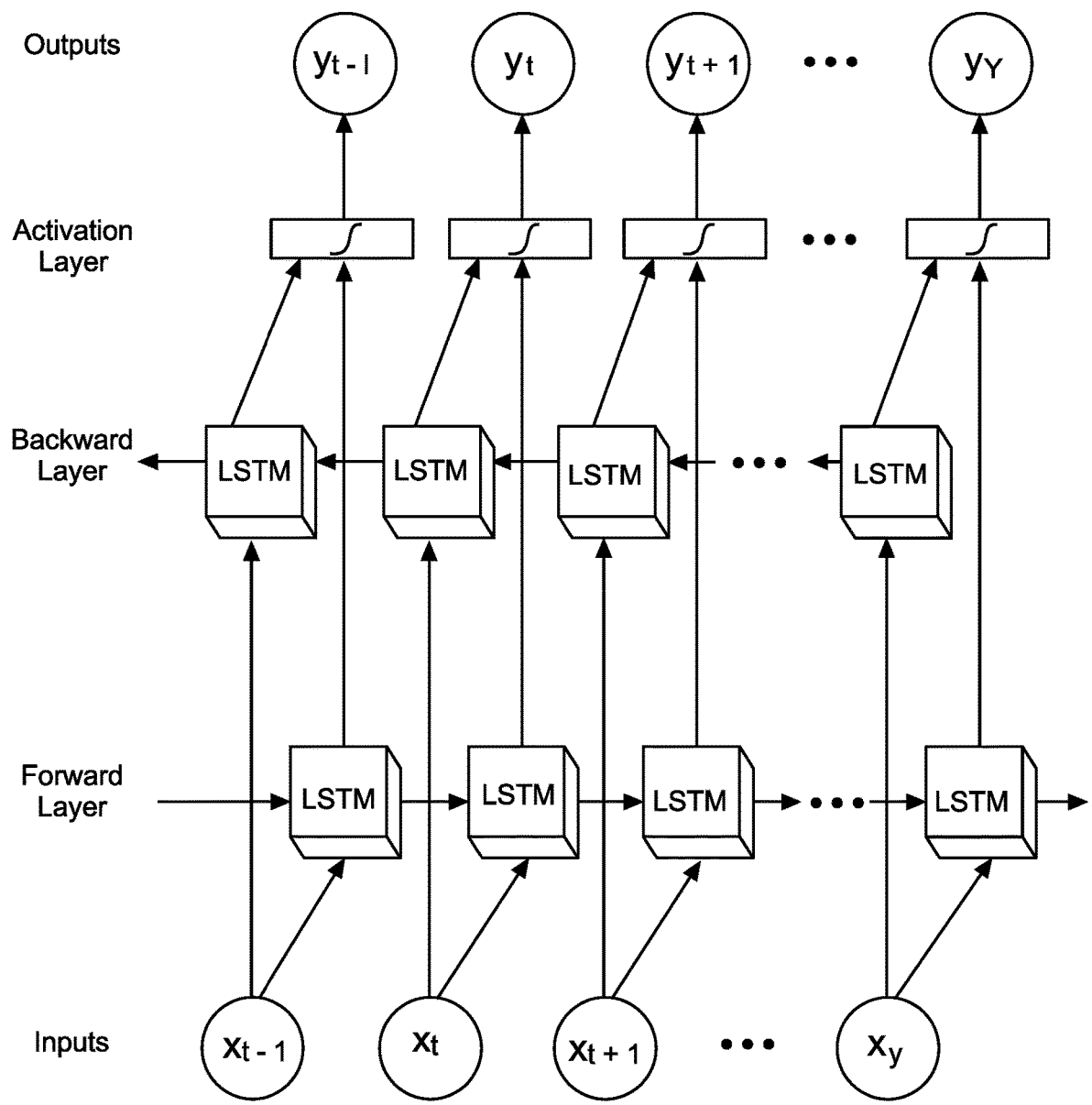
FIG. 6 shows an illustrative bi-directional long short term memory artificial recurrent neural network, according to one embodiment of the present invention.

FIG. 6 shows an illustrative bi-directional long short term memory (LTSM) artificial recurrent neural network 600 for use by a word embeddings generator such as module 540 in FIG. 5, according to one embodiment of the present invention. LSTMs are a special type of recurrent neural networks with feedback connections and are capable of learning long-term dependencies in sequences of data such as speech or natural language, video, and handwriting. A typical LSTM unit is comprised of cell units. The long-term memory refers to learned weights in the neural network, and the short-term memory refers to gated cell states. Bi-directional LSTMs such as 600 are an extension of traditional LSTMs with improved performance. Bi-directional LSTMs train two instead of one LSTM on the input sequence. The first LSTM is trained on an input sequence as-is and the second is trained on a reversed copy of the input sequence. Such training not only provides additional context of the input but also results in faster learning. That is, performance can be enhanced by knowledge of the data before and after the portion of the input currently being learned from.

Figure 7:
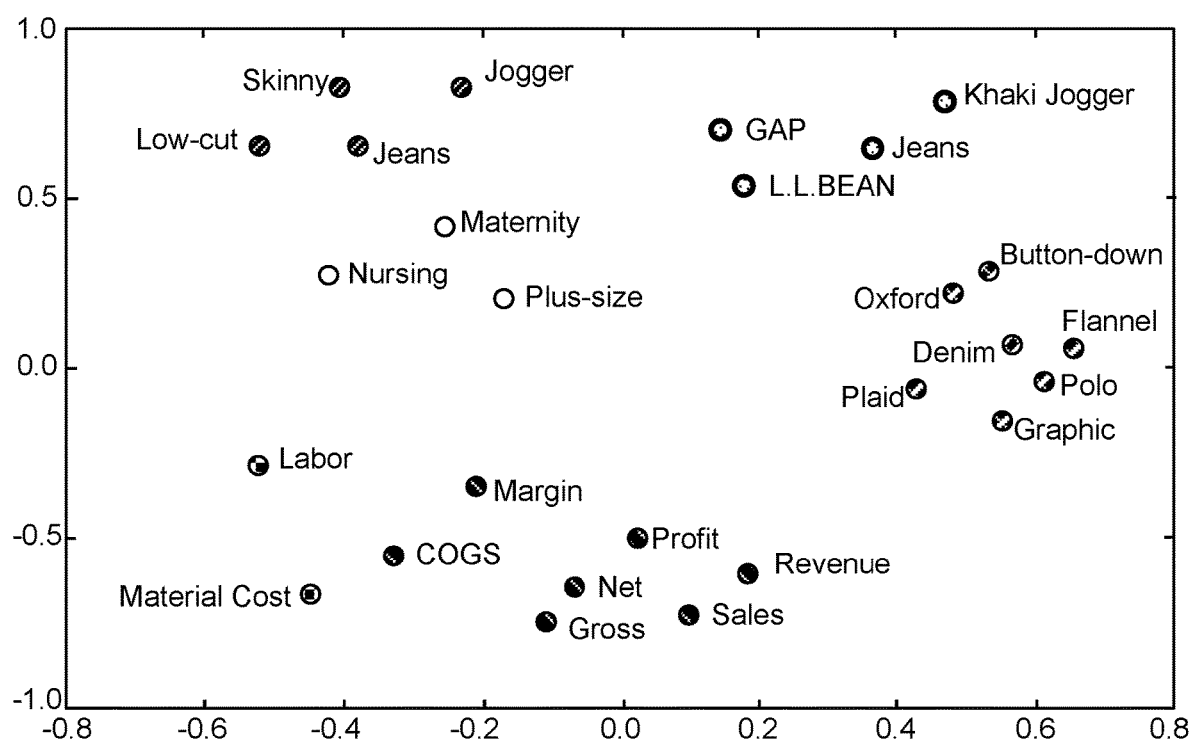
FIG. 7 shows an illustrative vector diagram of a word embedding, according to one embodiment of the present invention.

FIG. 7 shows an illustrative vector diagram 700 of a word embedding, according to one embodiment of the present invention. A word embedding is a learned vector representation for text where words and phrases that have the same or similar meanings have similar representations, and are closer in distance from each other. Individual words may be represented in a word embedding as real-valued vectors in a predefined vector space with each word mapped to one vector. The distributed representation of words is learned based on usage, with words used in similar ways mapped closer together, thereby capturing semantic meanings. In some embodiments, words having similar intents or contexts and are closely related to each other are mapped to similar representations in a word embedding. The learning process for a word embedding may be joined with a task-specific neural network model or may be an unsupervised process. Various techniques may be used to learn a word embedding from text data, including but not limited to, bi-directional LTSMs, an embedding layer, Word2Vec, and Global Vectors (GloVe).

Figure 8:
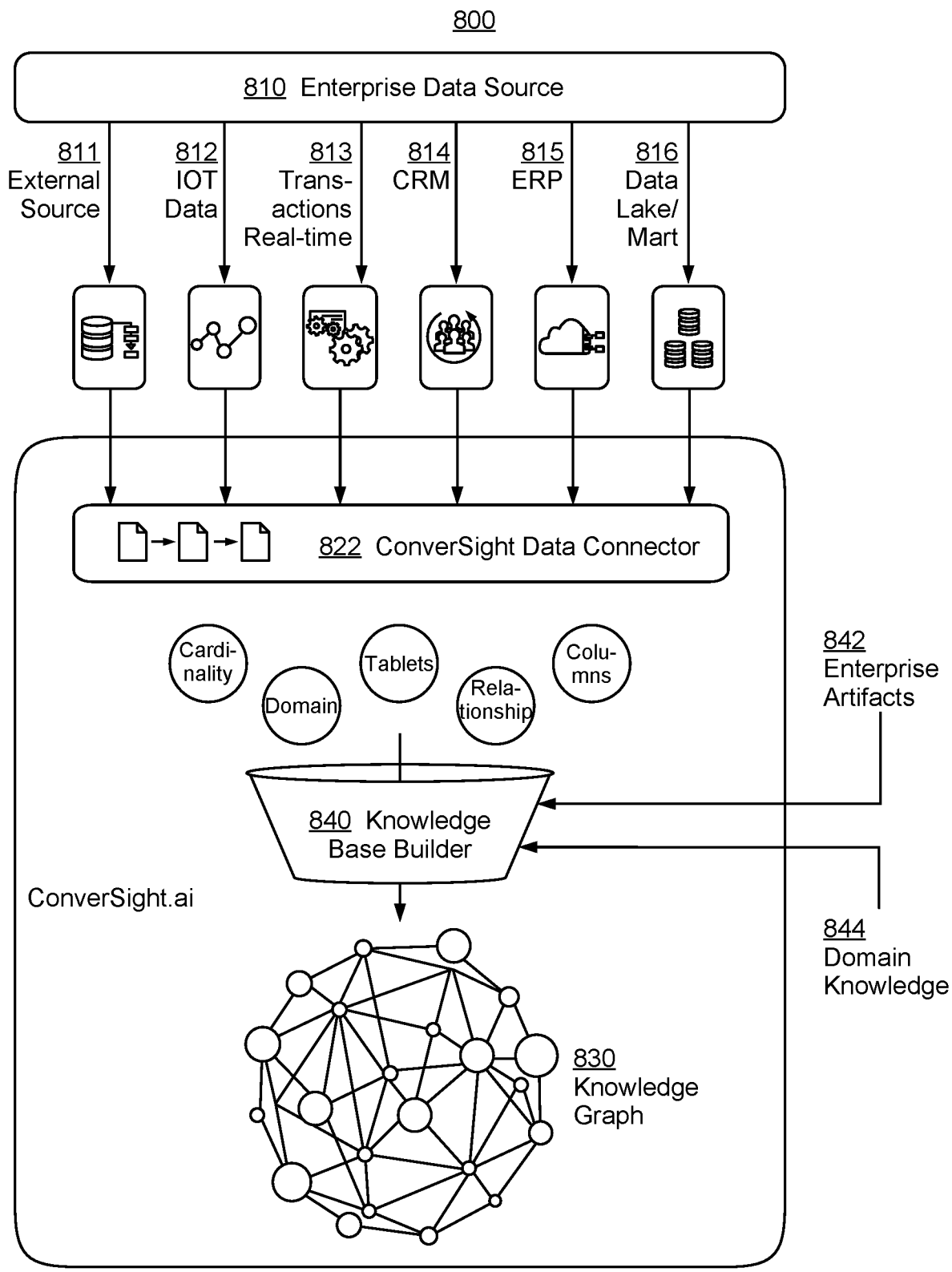
FIG. 8 is an exemplary schematic diagram for using a knowledge base builder module, according to one embodiment of the present invention.

FIG. 8 is an exemplary schematic diagram 800 for using a knowledge base builder module 840 to construct a knowledge graphs 830, according to one embodiment of the present invention. In this illustrative embodiment, enterprise data source 810 may provide one or more of many different types of input data, including but not limited to, structured or unstructured data 811 from external sources, IoT data 812, real-time transaction data 813, CRM data 814, ERP data 815, and Data Lake/Mart data 816. Such input data are processed and profiled through a data connector 822, before being passed to knowledge base builder 840 to construct knowledge graph 830. Additionally, unstructured enterprise artifacts data 842 and domain knowledge 844 may be utilized by knowledge base builder 840 in constructing and refining knowledge graph 830.

Figure 9A:
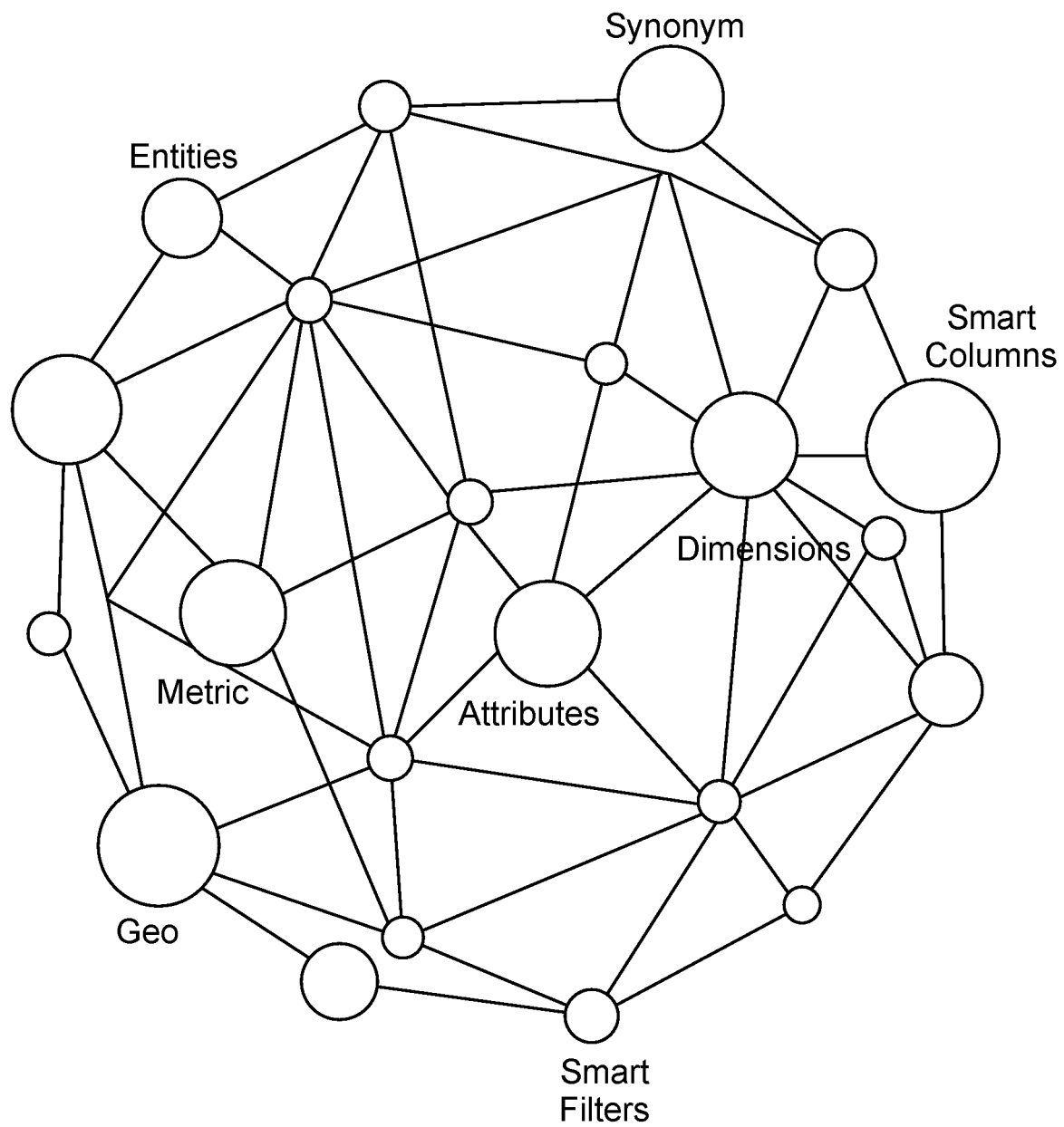
FIG. 9A shows an illustrative knowledge graph generated by a knowledge base builder module, according to one embodiment of the present invention.

FIG. 9A shows an illustrative knowledge graph 900 that may be generated by a knowledge base builder module or a knowledge graph builder module, according to one embodiment of the present invention. A knowledge graph provides a collection of interlinked descriptions of real-world objects, events, people, abstract concepts etc., which are termed as entities. Such entities are linked in node-edge representations wherein each edge represents a relationship between its two ending entity nodes. That is, a knowledge graph is a data entity relationship graph made of vertices connected by edges. As discussed with reference to FIG. 3, data entity relationships in a knowledge graph are not limited only to the {subject, predicate, object} semantic triple which codifies semantic data into a statement. Instead, knowledge graphs in embodiments of the present invention may also include entity nodes that represent transactional data, quantitative metrics, metadata, smart filters and other data processing functions, as well as analytical languages that may be run and applied upon structured data associated with connected entity nodes.

In this illustrative knowledge graph 900, several entity nodes are labeled with entity types. For example, synonym refers to entities having similar semantic meanings; attributes refer to entity attributes such as types and dimensions;

metric refers to quantitative metrics that may be used to measure specific characteristics of some interlinked entities; and geo refers to regional information. In addition, smart filters and smart columns may be created in an enterprise setting. As enterprise data may be very transactional in nature, it is often desired to perform algorithmic analytics on such data to generate data statistics and characterizations. Smart filters and smart columns attached to a knowledge graph may be used to filter or limit data used in such analysis. For example, a smart filter may provide lists of open orders, partially-filled orders, or fully-filled orders.

Once constructed, knowledge graphs can provide background knowledge, concept, and entity awareness to enable accurate interpretation of an input text. Knowledge graphs can also be used to augment the input data by replacing or tagging the input data with links or references to specific related concepts or entities in the graphs. Furthermore, knowledge graphs provide interrelationships over which data entities may be filtered, combined, assimilated, aggregated, or integrated to provide analytics or insights. Information or data entity and relationship representation in a particular formal ontology in a knowledge graph also enables and facilitates fast automated information processing.

Figure 9B:
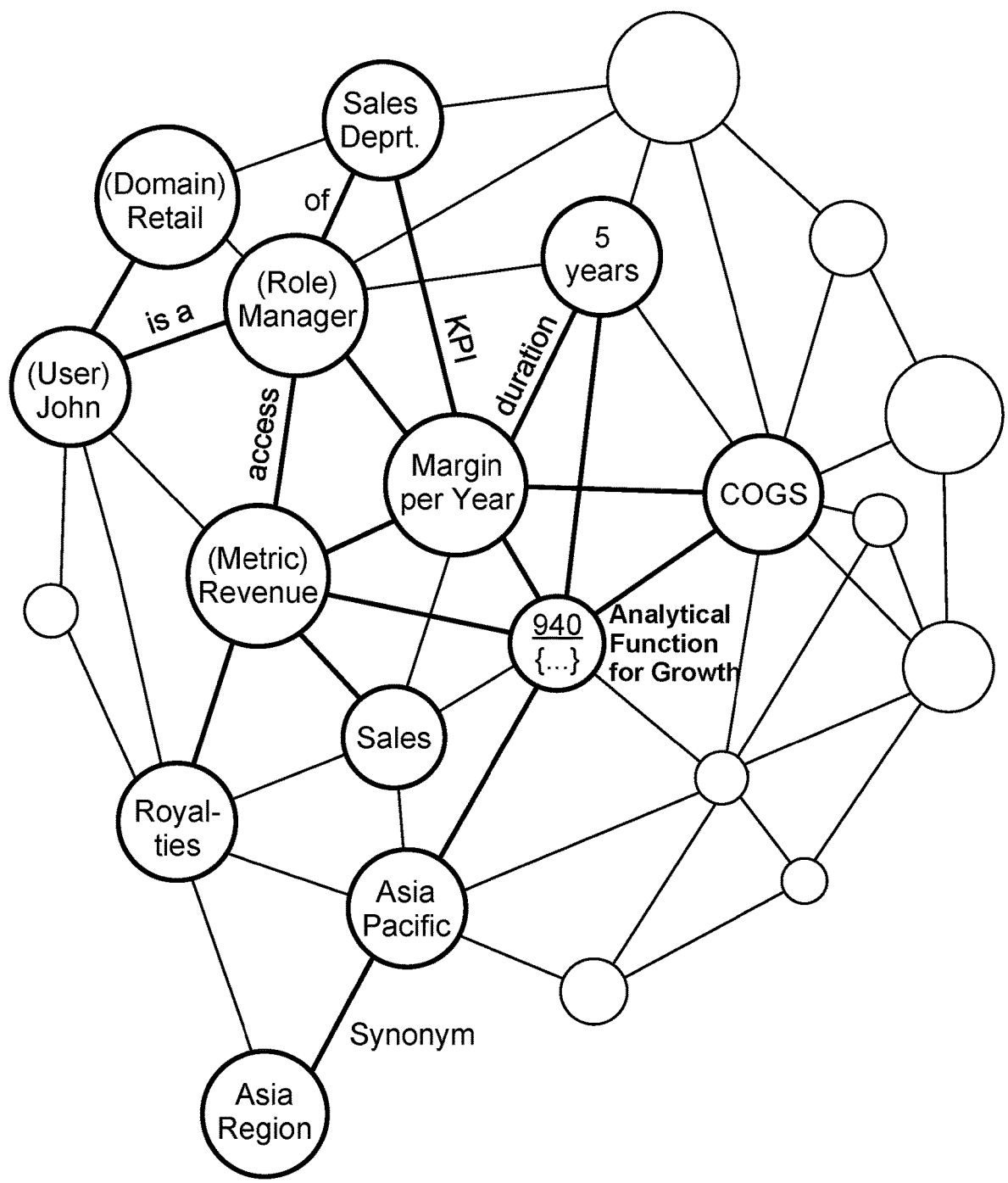
FIG. 9B shows an illustrative instance of an enterprise knowledge graph that may be used to generate data insights for the conversation shown in FIG. 2B, according to one embodiment of the present invention.

As a specific example, FIG. 9B shows an illustrative instance of an enterprise knowledge graph that may be used to generate data insights for the conversation shown in FIG. 2B, according to one embodiment of the present invention. In this example, the system is responding a user John who has asked the question "what is the yearly growth for last 5 years in the Asia-Pacific Region" under a user context (e.g., {gross profit margin}) that has been obtained from a previous interaction John has had with the system. In addition, John is known to be or has the attributes of being a manager of the sales department in the current enterprise for which this knowledge graph has been constructed for, possibly with data access rights associated with his managerial role. In answering John's question, the system matches a semantic meaning (e.g. {growth, yearly, Asia-Pacific}) to the knowledge graph under the current context, and determines entities and relationships that can be used to answer this question. For example, profit margin may be computed from the cost of goods sold (COGS) and revenue, which in turn may be calculated from royalties and sales, over a duration of 5 years, in the Asia-Pacific Region. An analytical function for growth 940 may act upon these interrelated data entities, and may be used to generate a sequence of analytical instructions for accessing structured enterprise data to generate the bar chart response shown in FIG. 2B.

Figure 10:
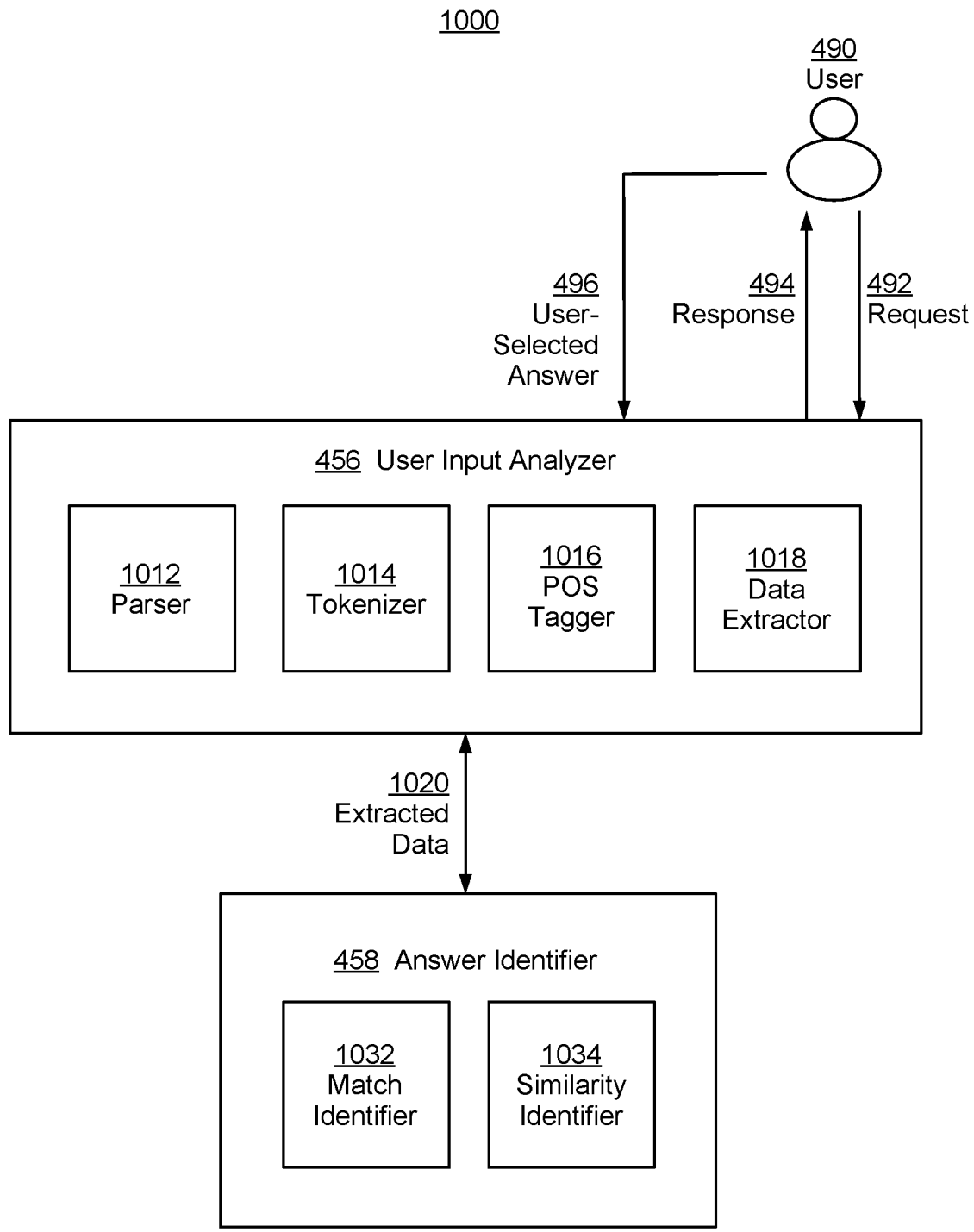
FIG. 10 is a block diagram of an illustrative answer identifier and a user input analyzer, according to one embodiment of the present invention.

FIG. 10 is a block diagram 1000 showing the illustrative answer identifier module 458 and user input analyzer module 456 in FIG. 4, according to one embodiment of the present invention. While user input analyzer 456 is shown as being external to answer identifier 458, in some embodiments, these two may be implemented as a single module within response provider 450. User input analyzer 456 receives request 492 and processes the request using text processing techniques. Accordingly, user input analyzer 456 may include a parser 1012, a tokenizer 1014, a part-of-speech (POS) tagger 1016, and a data extractor 1018. Request 492 received in a natural language may be parsed by parser 1012 for generation of tokens by tokenizer 1014, which are then tagged with parts of speech information by POS tagger 1016. Tokens tagged with POS information may then be analyzed by data extractor 1018 to extract data 1020 such as one or more entities associated with request 492, attributes of entities being requested, and one or more actions to be executed.

In some embodiments, extracted data 1020 carry a semantic meaning of user request 492. Extracted data 1020 may be accessed by answer identifier 458 to obtain data or insights to be included in response 494. Extracted data 1020 may be employed by a match identifier 1032 to identify matching entities and relationships from one or more knowledge graphs. In one example, text matching techniques in conjunction with structural and semantic matching may be used to identify matching data from one or more of word embeddings 442 and knowledge graphs 444. If a match is found, it may be conveyed to answer presenter 459 for transmission to the user. If an exact match cannot be found, extracted data 1020 may be provided to a similarity identifier 1034 which identifies one or more close-by entities, entity attributes, or entity relationships based on some similarity measures as detailed further herein. The one or more similar entities, attributes, or entity relationships may be framed using one of the interaction interfaces 452 selected by interface selector 454 and provided to user 490 to prompt additional answer 496.

Figure 11:
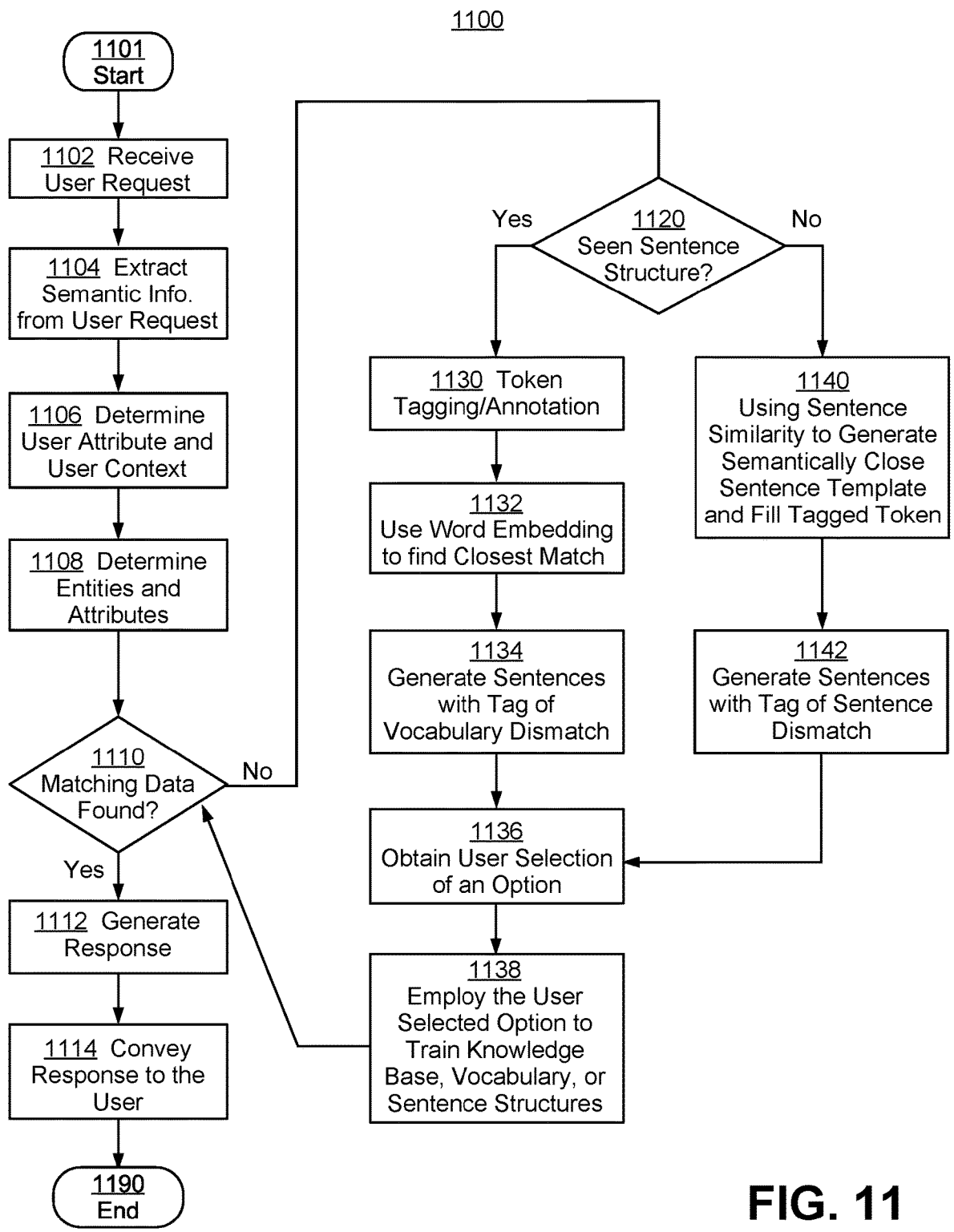
FIG. 11 is a flowchart for an illustrative process to generate context-based data insight responses to user requests, according to one embodiment of the present invention.

FIG. 11 is a flowchart for an illustrative process to generate context-based data insight responses to user requests, according to one embodiment of the present invention. Upon initiation at a step 1101, a user request is first received from a user at step 1102. The request may be related to a particular domain or enterprise, and maybe delivered to the COVERSIGHT system 420 via one of the plurality of interaction interfaces 452.

At step 1104, the user request is analyzed to extract semantic information or meaning. As mentioned previously, textual content of the request may be parsed, tokenized and tagged with POS data. In some embodiments, a plurality of candidate semantic meanings are constructed from the tokenized user request; and one of the plurality of candidate semantic meanings may be selected based on a knowledge graph and a word embedding as a true semantic meaning of the user request.

At step 1106, user attribute and context data are determined, from the user request itself, and/or based on previous user interaction data. Here the user request may also comprise any internal user data that are associated with the user but not displayed or presented directly on interaction interfaces 452. For example, user attributes may be extracted or identified from a user profile that may be accessed by a data profiler.

Based on tokens tagged with POS data, data entities and/or entity attributes associated with the user request may be identified at a next step 1108 by data extractor 1018 in FIG. 10. Recall such data entities and/or attributes may represent the semantic meaning of the user request.

At step 1110, it is determined whether matching data pertinent to the user request, or the semantic meaning of the user request, can be identified from word embeddings 442 and knowledge graphs 444 in FIG. 4. If matching data (e.g., entities and entity relationships on the knowledge graphs) are identified, a response is generated at step 1112 and conveyed to the user at step 1114 via one or more of interaction interfaces 552. In some embodiments, the user may accept the answer or response provided at step 1114, in which case the system may record a successful interaction, thereby learning about user intent, context, and vocabulary usage.

If it is determined at step 1110 that an accurate matching cannot be identified, the system may attempt to generate a question, prompt, or suggestion to the user, as a way to collect additional user input to clarify the original user request. In this particular embodiment, the user request is assessed at step 1120 to determine if its sentence structure has been seen before, for example, by comparing to a syntactic and semantic database internal to the knowledge base. If the answer is yes, next a step 1130 is performed to annotate and tag tokens, if any has not previously been annotated. Subsequently, a word embedding is used to help find closest matches to the user request's semantic meaning at a step 1132, optionally taking into account of user attributes such as but not limited to the terminology generally used within the context, the domain and the enterprise to provide suggestions. These closest matches are made into questions such as "Did you mean this" in a step 1134 to guide the user in framing the request correctly and to ask the right questions. Here the question may be assigned a vocabulary dismatch tag. In some embodiments, dismatch may indicate that no matching terminologies or data entities has been found on the knowledge graph; in some embodiments, dismatch may indicate a mismatch, where a matching result is found with a very low matching score or confidence level. The user may answer the system generated question or system provided option, for example by stating or selecting yes or no, at a step 1136. This user feedback is used in a step 1138 to adaptively or progressively train and enforce parts of the knowledge base, including but not limited to the word embedding, the knowledge graphs, vocabularies, and the syntactic and semantic database that records sentence structures. From another perspective, the user-selected answer is used by the knowledge base builder for supervised training of the knowledge base wherein labelled data is provided by the user for adding to one or more of the knowledge graphs and the word embeddings. The system learns elements such as user context and vocabularies usage from the user interactions, and improves the knowledge base with greater interaction. In addition, the user-selected answers may be stored under user profile or user attribute for future reference.

At step 1120, if it is determined that a sentence structure of the user request has not been seen before, a next process step 1140 may be performed to generate semantically close sentence templates using sentence similarity information, and to fill tagged tokens. According to such sentence templates, at a step 1142, question sentences may be generated with a sentence dismatch tag, for presentation to the user and feedback collection at step 1136. The data entity matching and user interaction process continues until a match is found and an insight response to the user is generated.

Figure 12:
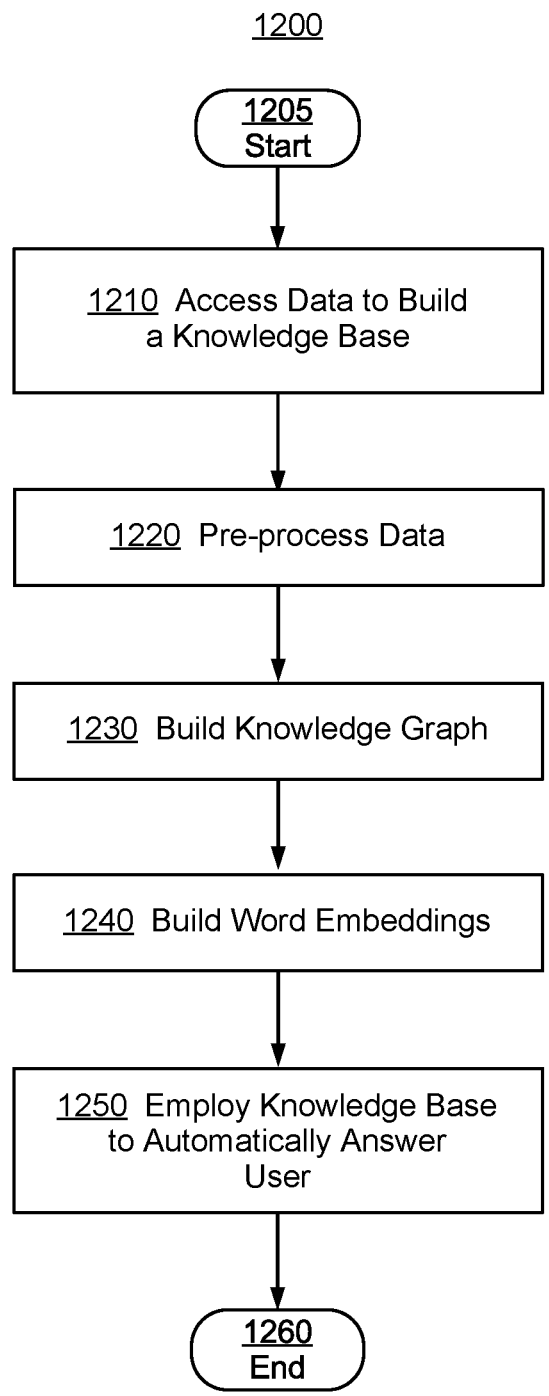
FIG. 12 is a flowchart for an illustrative process to build a knowledge base, according to one embodiment of the present invention.

FIG. 12 is a flowchart 1200 for an illustrative process to build a knowledge base, according to one embodiment of the present invention. This process may be executed by a knowledge base builder such as 430 shown in FIG. 5. Upon initialization at step 1205, structured data 412 and unstructured data 414 for building the knowledge base is first accessed at a step 1210, and pre-processed accordingly at step 1220. Again, structured data 412 may include database tables with columns and metadata thereof, such as data types, relationships between the various columns, cardinality, rank, etc. Structured data 412 is used to build one or more knowledge graphs 444 in a step 1230 for understanding user intent, context, and questions. On the other hand, unstructured data 414 may include free text in web articles, reports such as financial statements, domain news from various online or offline resources, newsletters, product manuals, communications exchanged between employees of an organization, etc. From structured data 412, entities and entity attributes may be directly identified using metadata such as column names and data types. On the other hand, unstructured data 414 may need to be parsed, tokenized and processed via a deep learning model to build one or more word embeddings 442 in a step 1240. Knowledge base 440 comprising knowledge graphs 444 and word embeddings 442 is employed at a step 1250 to respond to user requests for information as detailed herein. The overall process terminates at step 1260.

Figure 13:
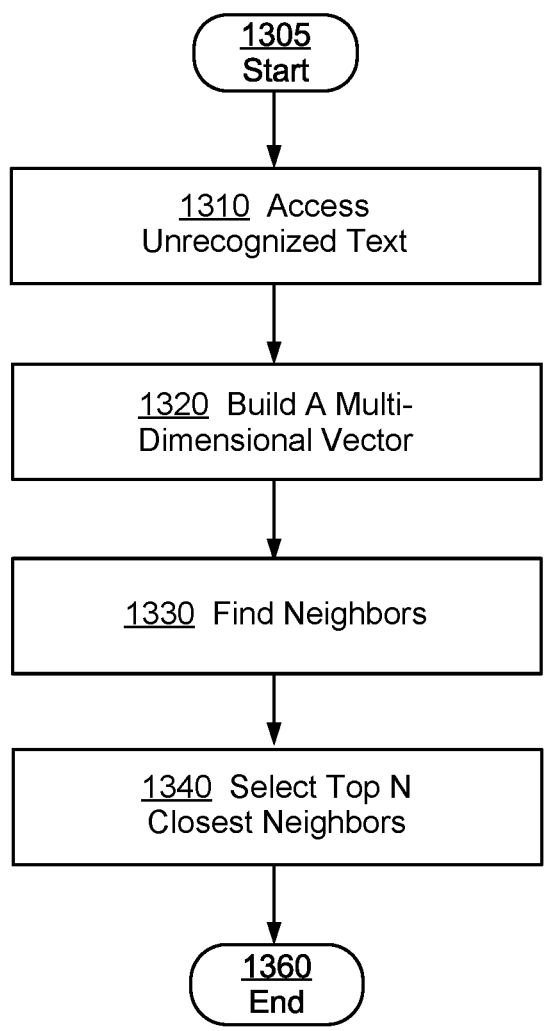
FIG. 13 is a flowchart for an illustrative process to determine similar vocabularies when generating a response to a user request, according to one embodiment of the present invention.

FIG. 13 is a flowchart 1300 for an illustrative process to determine similar vocabularies when generating a response to a user request, according to one embodiment of the present invention. This process may be executed by a similarity identifier such as 1034 shown in FIG. 10. Upon initialization at a step 1305, an unrecognized text or a portion of the user request 492 for which no accurate matches could be identified from knowledge graph 444 is accessed at a step 1310. A multi-dimensional vector may be built using tokens extracted from request 492 as a key at a step 1320. Next at a step 1330, neighbors of the multi-dimensional vector may be found from word embedding 442 using, for example, the K-nearest neighbor algorithm, and the top N closest neighbors where N is a natural number may be selected at a step 1340 and provided as a similar response 494 to user 490.

Figure 14:
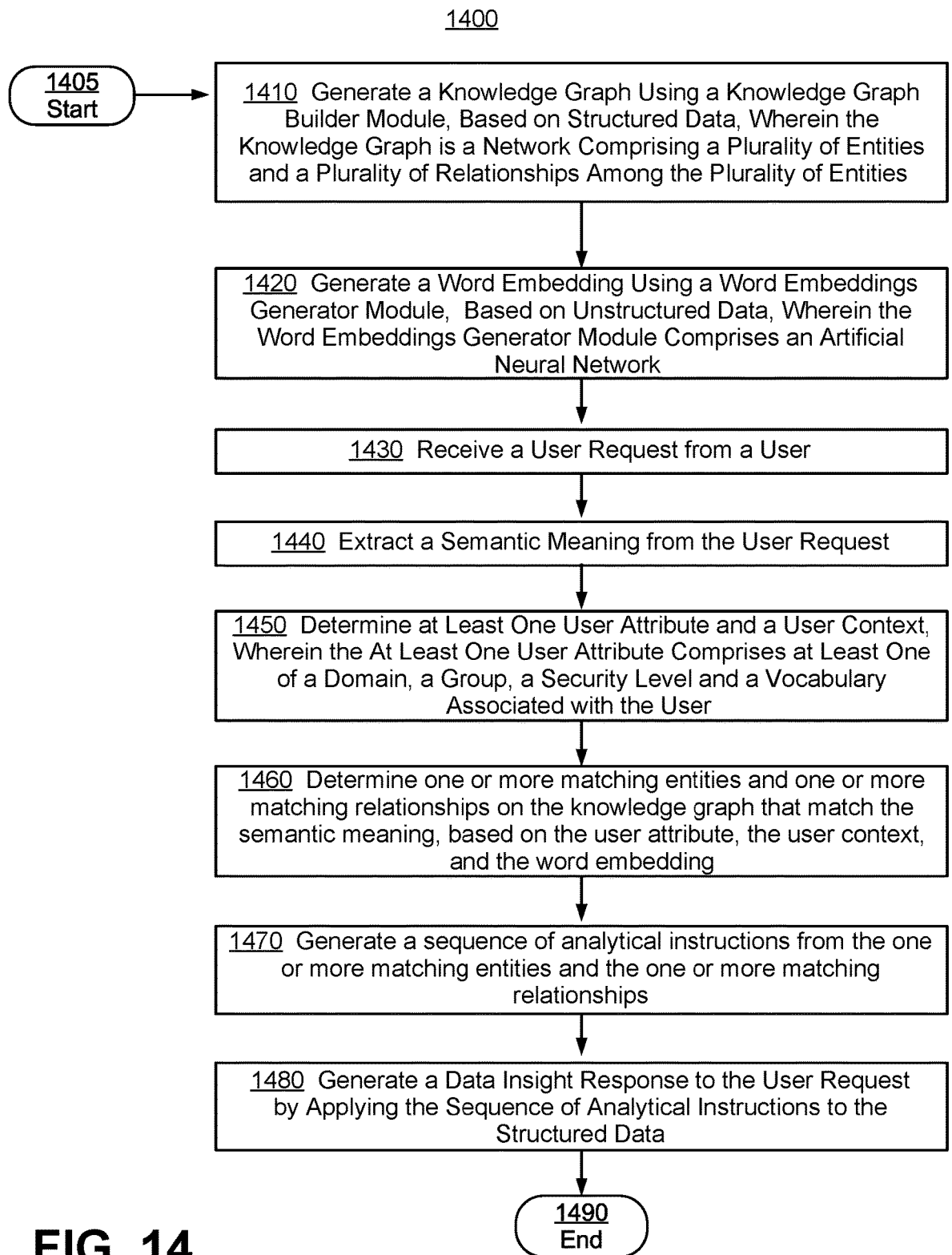
FIG. 14 is a flowchart for an illustrative process to generate a data insight response to a user request, according to one embodiment of the present invention.

FIG. 14 is a flowchart for an illustrative process to generate a data insight response to a user request, according to one embodiment of the present invention. Upon initialization at step 1405, a knowledge graph is first built using a knowledge graph builder module at a step 1410, based on structured data, wherein the knowledge graph is a network comprising a plurality of entities and a plurality of relationships among the plurality of entities. At a step 1420, a word embedding is generated using a word embedding generator module, based on unstructured data, wherein the word embedding generator module comprises an artificial neural network. At a step 1430, a user request is received from a user. At a step 1440, a semantic meaning is extracted from the user request. At a step 1450, at least one user attribute and a user context are determined, wherein the at least one user attribute comprises at least one of a domain, a group, a security level, and a vocabulary associated with the user. At a step 1460, one or more matching entities and one or more matching relationships on the knowledge graph are determined to match the semantic meaning of the user request, based on the user attribute, the user context, and the word embedding. At a step 1470, a sequence of analytical instructions are generated from the one or more matching entities and the one or more matching relationships. At a step 1480, a data insight response to the user request is generated, by applying the sequence of analytical instructions to the structured data. The overall process terminates at a step 1490.

Implementation using Computer Program Products, Methods, and Computing Entities

Exemplary System Architecture

Figure 15:
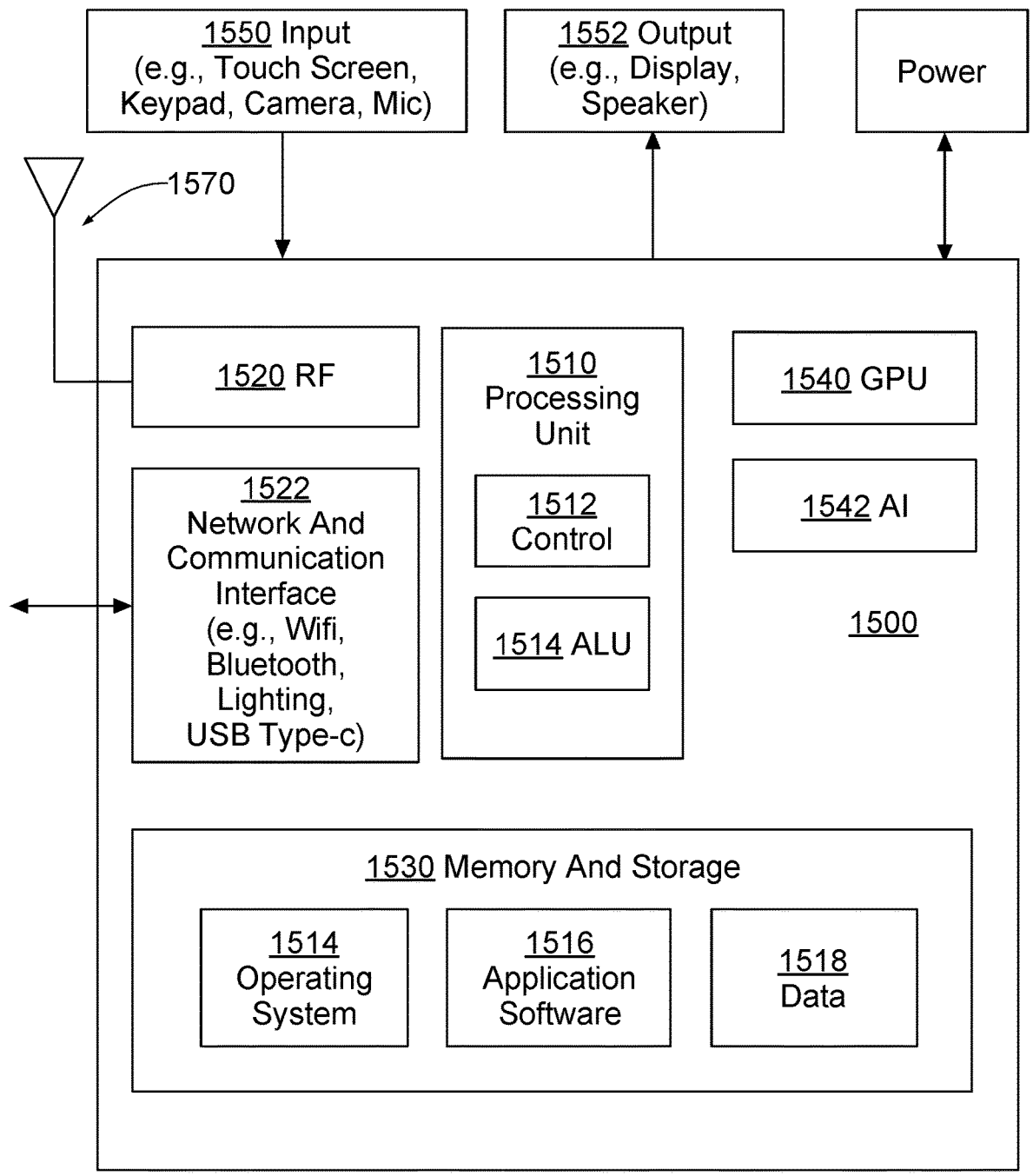
FIG. 15 is an exemplary schematic diagram of a user computing entity for implementing an end user device with at least one user interface, according to exemplary embodiments of the present invention.
Figure 16:
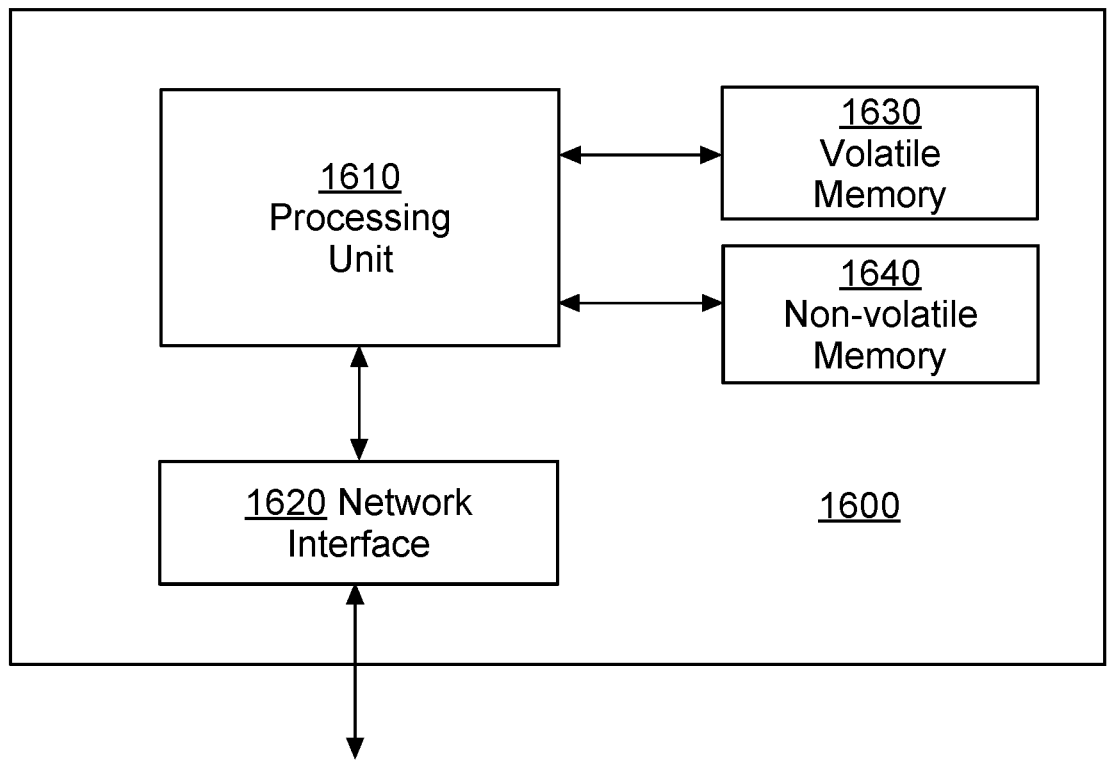
FIG. 16 is an exemplary schematic diagram of a management computing entity for implementing a server device, according to exemplary embodiments of the present invention.

An exemplary embodiment of the present invention may include one or more end user computing entities 1500 for implementing user device functionality as described herein, one or more networks, and one or more servers, or other management computing entities 1600 for implementing server side functionality as described herein, which are shown schematically in FIGS. 15 and 16. Each of these components, entities, devices, systems, and similar words used herein interchangeably may be in direct or indirect communication with, for example, one another over the same or different wired or wireless networks. Additionally, while FIGS. 15 and 16 illustrate the various system entities as separate, standalone entities, the various embodiments are not limited to this particular architecture.

Exemplary User Computing Entity

FIG. 15 is an exemplary schematic diagram of a user computing entity for implementing an end user device with at least one user interface, according to exemplary embodiments of the present invention. An end user computing device 1500 includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. On the other hand, a server may be implemented according to the exemplary schematic diagram shown in FIG. 16, possibly in the cloud, and possibly with logically or physically distributed architectures.

As shown in FIG. 15, the user computing entity 1500 may include an antenna 1570, a radio transceiver 1520, and a processing unit 510 that provides signals to and receives signals from the transceiver. The signals provided to and received from the transceiver may include signaling information in accordance with air interface standards of applicable wireless systems. In this regard, the user computing entity 1500 may be capable of operating with one or more air interface standards, communication protocols, modulation types, and access types. More particularly, the user computing entity 1500 may operate in accordance with any of a number of wireless communication standards and protocols. In some embodiments, user computing entity 1500 may operate in accordance with multiple wireless communication standards and protocols, such as 5G, UMTS, FDM, OFDM, TDM, TDMA, E-TDMA, GPRS, extended GPRS, CDMA, CDMA2000, 1xRTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, user computing entity 1500 may operate in accordance with multiple wired communication standards and protocols, via a network and communication interface 1522.

Via these communication standards and protocols, user computing entity 1500 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 1500 can also download changes, add-ons, and updates, for instance, to its firmware, software (e.g., including executable instructions, applications, program modules), and operating system.

In some implementations, processing unit 1510 may be embodied in several different ways. For example, processing unit 1510 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 1510 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1510 may be configured for a particular use or configured to execute instructions stored in volatile or non-volatile media or otherwise accessible to the processing unit. As such, whether configured by hardware or computer program products, or by a combination thereof, processing unit 1510 may be capable of performing steps or operations according to embodiments of the present invention when configured accordingly.

In some embodiments, processing unit 1510 may comprise a control unit 1512 and a dedicated arithmetic logic unit 1514 (ALU) to perform arithmetic and logic operations. In some embodiments, user computing entity 1500 may optionally comprise a graphics processing unit 1540 (GPU) for specialized image and video rendering tasks, and/or an artificial intelligence (AI) accelerator 1542, specialized for applications including artificial neural networks, machine vision, and machine learning. In some embodiments, processing unit 1510 may be coupled with GPU 1540 and/or AI accelerator 1542 to distribute and coordinate processing tasks.

In some embodiments, user computing entity 1500 may include a user interface, comprising an input interface 1550 and an output interface 1552, each coupled to processing unit 1510. User input interface 1550 may comprise any of a number of devices or interfaces allowing the user computing entity 1500 to receive data, such as a keypad (hard or soft), a touch display, a mic for voice/speech, and a camera for motion or posture interfaces. User output interface 1552 may comprise any of a number of devices or interfaces allowing user computing entity 1500 to provide content and information to a user, such as through a touch display, or a speaker for audio outputs. In some embodiments, output interface 1552 may connect user computing entity 1500 to an external loudspeaker or projector, for audio or visual output.

User computing entity 1500 may also include volatile and/or non-volatile storage or memory 1530, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 1514, application software 1516, data 1518, databases, database instances, database management systems, programs, program modules, SDKs, scripts, source code, object code, byte code, compiled code, interpreted code, machine code, executable instructions, and/or the like to implement the functions of user computing entity 1500. As indicated, this may include a user application that is resident on the entity or accessible through a browser or other user interface for communicating with a management computing entity and/or various other computing entities.

In some embodiments, user computing entity 1500 may include location determining aspects, devices, modules, functionalities, and/or similar words used herein interchangeably. For example, user computing entity 1500 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 1500 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In some embodiments, two or more users may establish a connection between their computing devices using any of the networking protocols listed previously. In some embodiments, the user computing devices may use a network interface such as 1522 to communicate with various other computing entities, to exchange data content, information, and/or similar terms used herein interchangeably that can be transmitted, received, operated on, processed, displayed, stored, and/or the like.

In some embodiments, data (e.g., audio, video, etc.) may be downloaded by one or more user computing devices to a server such as shown in FIG. 13 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

Exemplary Management Computing Entity

FIG. 16 is an exemplary schematic diagram of a management computing entity 1600 for implementing a server device, according to exemplary embodiments of the present invention. The terms computing entity, computer, entity, device, system, and/or similar words used herein interchangeably are explained in detailed with reference to user computing entity 1500. Management computing entity 1600 may have all, substantially all, or some of the computing entity 1500 components shown and described in FIG. 15.

As indicated, in one embodiment, management computing entity 1600 may include one or more network or communications interface 1620 for communicating with various computing entities, such as by communicating data, content, information, and/or similar terms used herein interchangeably that can be transmitted, received, operated on, processed, displayed, stored, and/or the like. For instance, management computing entity 1600 may communicate with user computing device 600 and/or a variety of other computing entities. Network or communications interface 1620 may utilized a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 1600 may be configured to communicate via wireless external communication networks using any of a variety of standards and protocols as discussed with reference to user computing device 600.

As shown in FIG. 13, in one embodiment, management computing entity 1600 may include or be in communication with one or more processing unit 1610 (also referred to as processors, processing circuitry, processing element, and/or similar terms used herein interchangeably) that communicate with other elements within the management computing entity 1600. As will be understood, processing unit 1610 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 1610 may be configured for a particular use or configured to execute instructions stored in volatile or non-volatile media 1630 and 1640. As such, whether configured by hardware or computer program products, or by a combination thereof, processing unit 1610 may be capable of performing steps or operations according to embodiments of the present disclosure when configured accordingly.

Although not shown explicitly, management computing entity 1600 may include or be in communication with one or more input elements, such as a keyboard, a mouse, a touch screen/display, a camera for motion and movement input, a mic for audio input, a joystick, and/or the like. Management computing entity 1600 may also include or be in communication with one or more output elements such as speaker, screen/display, and/or the like.

In various embodiments, one or more of the components of management computing entity 1600 may be located remotely from other management computing entity components, such as in a distributed system or in the cloud. Furthermore, one or more of the components may be combined and additional components performing functions described herein may be included in the management computing entity 1600.

Conclusions

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of streaming content and information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software). Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A natural language processing system for generating a data insight response to a user request, comprising:
    a processor; and
    a non-transitory, computer-readable storage medium for storing program code, wherein the program code when executed by the processor, causes the processor to:
        generate a knowledge graph using a knowledge graph builder module, based on structured data, wherein the knowledge graph is a network comprising a plurality of entities and a plurality of relationships among the plurality of entities;
        generate a word embedding using a word embeddings generator module, based on unstructured data, wherein the word embeddings generator module comprises an artificial neural network;
        receive the user request from a user;
        extract a semantic meaning from the user request;
        determine at least one user attribute and a user context, wherein the at least one user attribute comprises at least one of a domain, a group, a security level and a vocabulary associated with the user;
        determine one or more matching entities and one or more matching relationships on the knowledge graph that match the semantic meaning, based on the user attribute, the user context, and the word embedding;
        in response to determining that no entity is found on the knowledge graph to match the semantic meaning based on the user attribute and the user context:
            determine whether a sentence structure of the user request exists in a seen syntactic and semantic database;
            in response to determining that the sentence structure of the user request exists in the seen syntactic and semantic database:
                identify at least one closest matching entity on the knowledge graph, based on the word embedding;
                generate a first sentence with a tag of vocabulary dismatch, based on the at least one closest matching entity;
                generate a plurality of options based on the first sentence;
                receive a user selection of one of the plurality of options; and
                update, based on the user selection, at least one of the knowledge graph, the word embedding, the vocabulary associated with the user, and the seen syntactic and semantic database;
        generate a sequence of analytical instructions from the one or more matching entities and the one or more matching relationships; and
        generate the data insight response to the user request by applying the sequence of analytical instructions to the structured data.

2. The natural language processing system of claim 1, wherein the program code to provide a plurality of options to the user, when executed by the processor, further causes the processor to:
    in response to determining that the sentence structure of the user request does not exist in the seen syntactic and semantic database,
        use a sentence similarity to generate at least one semantically close sentence template, and
        generate a second sentence with a tag of sentence dismatch, based on the at least one semantically close sentence template;

wherein the plurality of options is generated based on the first sentence or the second sentence.

3. The natural language processing system of claim 1, wherein the determination of the user context is based on at least one of the user request and a past user request.

4. The natural language processing system of claim 1, wherein the knowledge graph is specific to the domain, an enterprise, the group, or the user.

5. The natural language processing system of claim 1, wherein the program code to extract the semantic meaning from the user request, when executed by the processor, causes the processor to:
   construct a plurality of candidate semantic meanings from the user request; and
   select one of the plurality of candidate semantic meanings based on the knowledge graph and the word embedding.

6. The natural language processing system of claim 1, wherein the structured data comprises at least one of transactional data, financial data, operational data, and domain-specific metrics.

7. The natural language processing system of claim 1, wherein the unstructured data comprises at least one of articles, catalogues, manuals, domain-specific knowledge graphs, enterprise-specific knowledge graphs, and user-specific knowledge graphs.

8. The natural language processing system of claim 1, wherein the program code when executed by the processor, further causes the processor to determine a format of the data insight response, based on at least one of the user attribute and the user request.

9. A computer-implemented method utilized by a natural language processing system for generating a data insight response to a user request, the method executable by a processor, the method comprising:
   generating a knowledge graph using a knowledge graph builder module, based on structured data, wherein the knowledge graph is a network comprising a plurality of entities and a plurality of relationships among the plurality of entities;
   generating a word embedding using a word embeddings generator module, based on unstructured data, wherein the word embeddings generator module comprises an artificial neural network;
   receiving the user request from a user;
   extracting a semantic meaning from the user request;
   determining at least one user attribute and a user context, wherein the at least one user attribute comprise at least one of a domain, a group, a security and a vocabulary associated with the user;
   determining one or more matching entities and one or more matching relationships on the knowledge graph that match the semantic meaning, based on the user attribute, the user context, and the word embedding;
   in response to determining that no entity is found on the knowledge graph to match the semantic meaning based on the user attribute and the user context:
      determining whether a sentence structure of the user request exists in a seen syntactic and semantic database;
      in response to determining that the sentence structure of the user request exists in the seen syntactic and semantic database;
         identifying at least one closest matching entity on the knowledge graph, based on the word embedding;
         generating a first sentence with a tag of vocabulary dismatch, based on the at least one closest matching entity;
      generating a plurality of options based on the first sentence;
   receiving a user selection of one of the plurality of options; and
   updating, based on the user selection, at least one of the knowledge graph, the word embedding, the vocabulary associated with the user, and the seen syntactic and semantic database;
   generating a sequence of analytical instructions from the one or more matching entities and the one or more matching relationships; and
   generating the data insight response to the user request by applying the sequence of analytical instructions to the structured data.

10. The computer-implemented method of claim 9, wherein the providing a plurality of options to the user further comprises:
   in response to determining that the sentence structure of the user request does not exist in the seen syntactic and semantic database,
      using a sentence similarity to generate at least one semantically close sentence template, and
      generating a second sentence with a tag of sentence dismatch, based on the at least one semantically close sentence template;
   wherein the plurality of options is generated based on the first sentence or the second sentence.

11. The computer-implemented method of claim 9, wherein the determining of the user context is based on at least one of the user request and a past user request.

12. The computer-implemented method of claim 9, wherein the knowledge graph is specific to the domain, an enterprise, the group, or the user.

13. The computer-implemented method of claim 9, wherein the extracting of the semantic meaning from the user request comprises:
   constructing a plurality of candidate semantic meanings from the user request; and
   selecting one of the plurality of candidate semantic meanings based on the knowledge graph and the word embedding.

14. The computer-implemented method of claim 9, wherein the structured data comprises at least one of transactional data, financial data, operational data, and domain-specific metrics.

15. The computer-implemented method of claim 9, wherein the unstructured data comprises at least one of articles, catalogues, manuals, domain-specific knowledge graphs, enterprise-specific knowledge graphs, and user-specific knowledge graphs.

16. The computer-implemented method of claim 9, further comprising:
   determining a format of the data insight response, based on at least one of the user attribute and the user request.

17. A non-transitory storage medium for storing program code, utilized by a natural language processing system, for generating a data insight response to a user request, wherein the program code is executable by a processor, and wherein the program code when executed by the processor causes the processor to:
   generate a knowledge graph using a knowledge graph builder module, based on structured data, wherein the knowledge graph is a network comprising a plurality of entities and a plurality of relationships among the plurality of entities;

generate a word embedding using a word embeddings generator module, based on unstructured data, wherein the word embeddings generator module comprises an artificial neural network;

receive the user request from a user;

extract a semantic meaning from the user request;

determine at least one user attribute and a user context, wherein the at least one user attribute comprise at least one of a domain, a group, a security and a vocabulary associated with the user;

determine one or more matching entities and one or more matching relationships on the knowledge graph that match the semantic meaning, based on the user attribute, the user context, and the word embedding;

in response to determining that no entity is found on the knowledge graph to match the semantic meaning based on the user attribute and the user context:

determine whether a sentence structure of the user request exists in a seen syntactic and semantic database;

in response to determining that the sentence structure of the user request exists in the seen syntactic and semantic database;

identify at least one closest matching entity on the knowledge graph, based on the word embedding;

generate a first sentence with a tag of vocabulary dismatch, based on the at least one closest matching entity;

generate a plurality of options based on the first sentence;

receive a user selection of one of the plurality of options; and update, based on the user selection, at least one of the knowledge graph, the word embedding, the vocabulary associated with the user, and the seen syntactic and semantic database;

generate a sequence of analytical instructions from the one or more matching entities and the one or more matching relationships; and generate the data insight response to the user request by applying the sequence of analytical instructions to the structured data.

\* \* \* \* \*